(12) United States Patent
Dowell

(10) Patent No.: US 8,705,890 B2
(45) Date of Patent: Apr. 22, 2014

(54) IMAGE ALIGNMENT

(75) Inventor: Larry Jonathan Dowell, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 520 days.

(21) Appl. No.: 13/098,578

(22) Filed: May 2, 2011

(65) Prior Publication Data

US 2012/0281921 A1 Nov. 8, 2012

(51) Int. Cl.
*G06K 9/36* (2006.01)
*G06K 9/20* (2006.01)

(52) U.S. Cl.
USPC .......................................... 382/284; 382/195

(58) Field of Classification Search
USPC .................................. 382/195, 284
See application file for complete search history.

(56) References Cited

U.S. PATENT DOCUMENTS 7,542,614 B2 *  6/2009  Silverstein et al. ........... 382/232
8,068,693 B2 * 11/2011  Sorek et al. ................... 382/284
8,155,452 B2 *  4/2012  Minear ......................... 382/218
2009/0257680 A1 * 10/2009  Dhand et al. ................. 382/284

* cited by examiner

*Primary Examiner* — Wesley Tucker
(74) *Attorney, Agent, or Firm* — Christopher P. Whitham; Cochran Freund & Young LLC

(57) ABSTRACT

Disclosed is a method and device for aligning at least two digital images. An embodiment may use frequency-domain transforms of small tiles created from each image to identify substantially similar, "distinguishing" features within each of the images, and then align the images together based on the location of the distinguishing features. To accomplish this, an embodiment may create equal sized tile sub-images for each image. A "key" for each tile may be created by performing a frequency-domain transform calculation on each tile. A information-distance difference between each possible pair of tiles on each image may be calculated to identify distinguishing features. From analysis of the information-distance differences of the pairs of tiles, a subset of tiles with high discrimination metrics in relation to other tiles may be located for each image. The subset of distinguishing tiles for each image may then be compared to locate tiles with substantially similar keys and/or information-distance metrics to other tiles of other images. Once similar tiles are located for each image, the images may be aligned in relation to the identified similar tiles.

22 Claims, 10 Drawing Sheets

104 SCHEMATIC ILLUSTRATION OF THE FIRST IMAGE ALIGNED WITH THE SECOND IMAGE USING COMMON FEATURES

100 SCHEMATIC ILLUSTRATION OF A FIRST IMAGE WITH THREE DISTINGUISHING FEATURES

102 SCHEMATIC ILLUSTRATION OF A SECOND IMAGE WITH FOUR DISTINGUISHING FEATURES

104 SCHEMATIC ILLUSTRATION OF THE FIRST IMAGE ALIGNED WITH THE SECOND IMAGE USING COMMON FEATURES

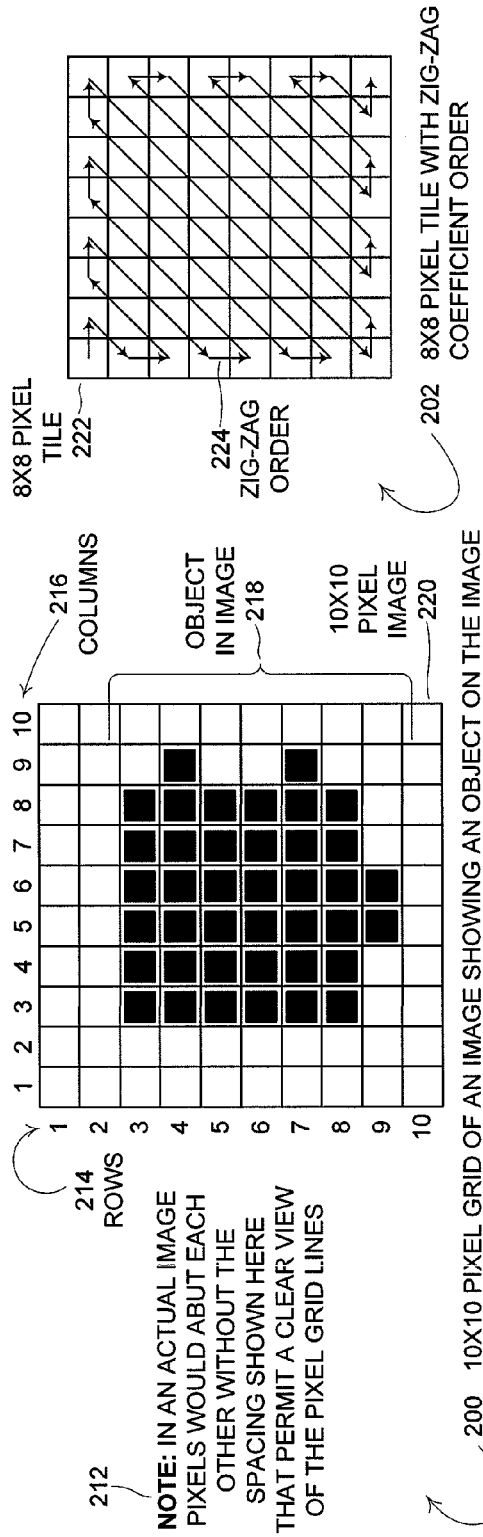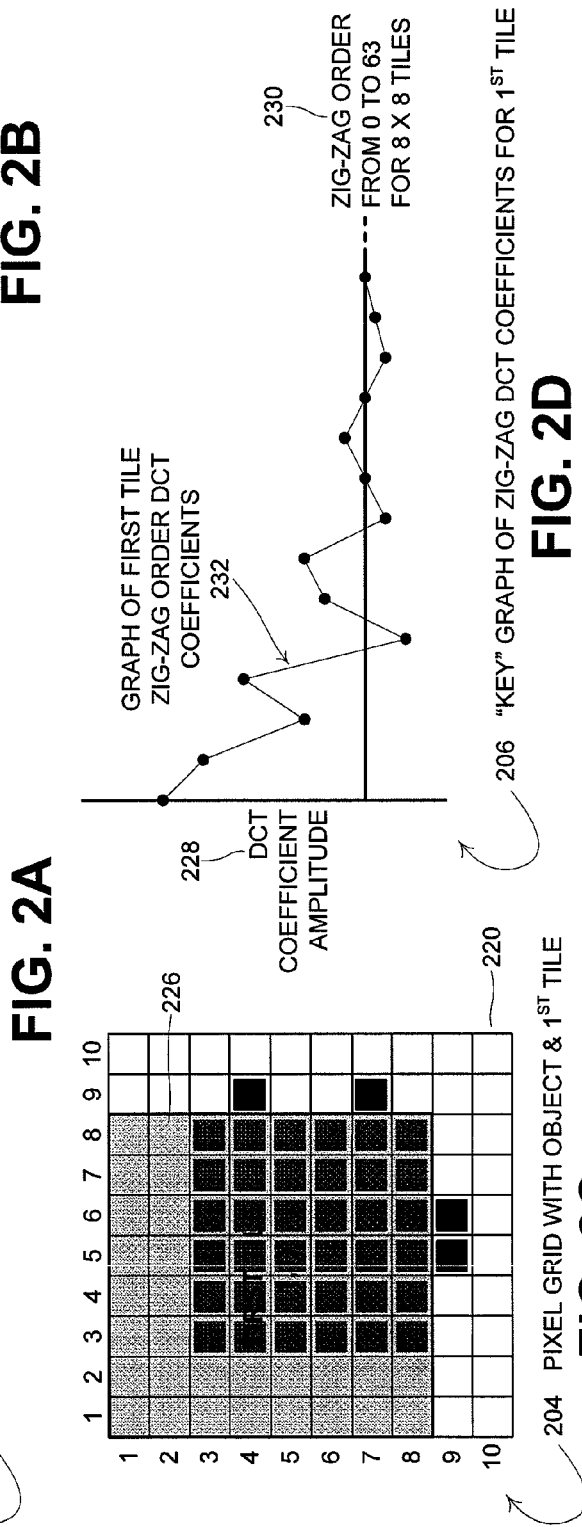

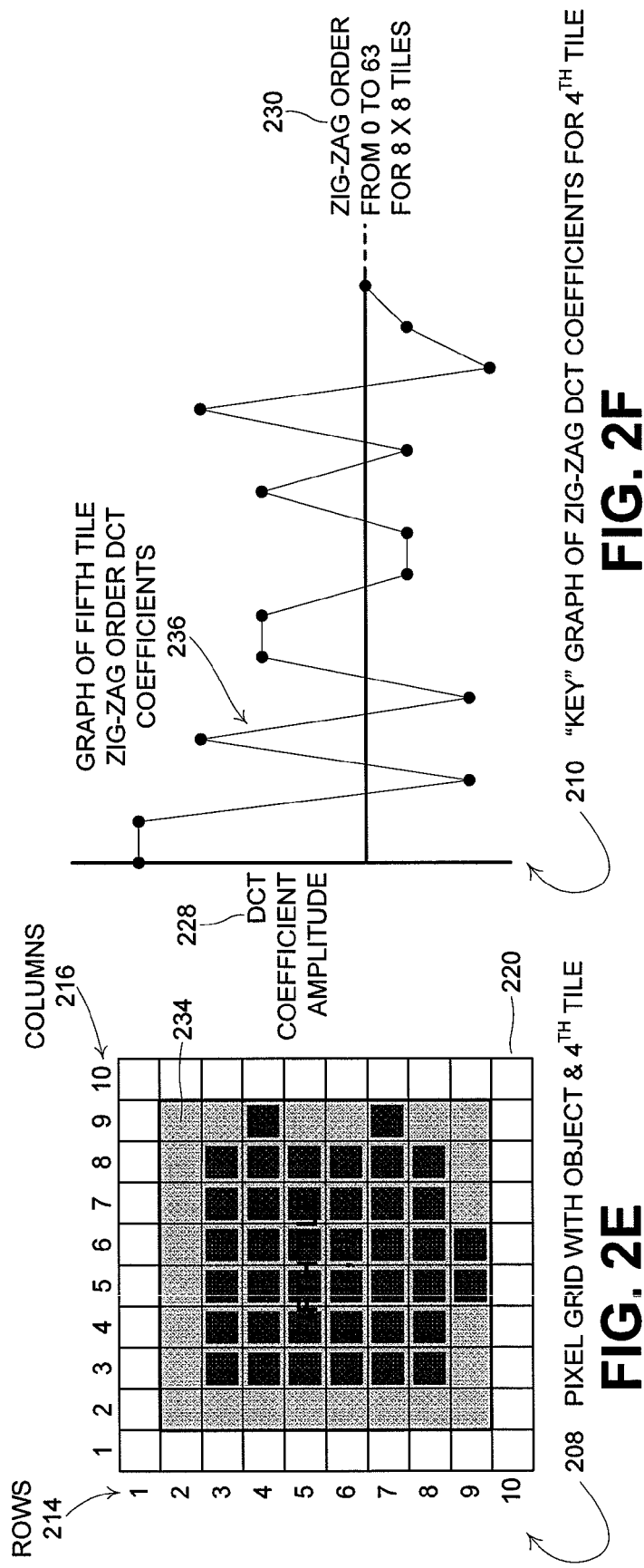
FIG. 2F 210 "KEY" GRAPH OF ZIG-ZAG DCT COEFFICIENTS FOR 4TH TILE
FIG. 2E 208 PIXEL GRID WITH OBJECT & 4TH TILE

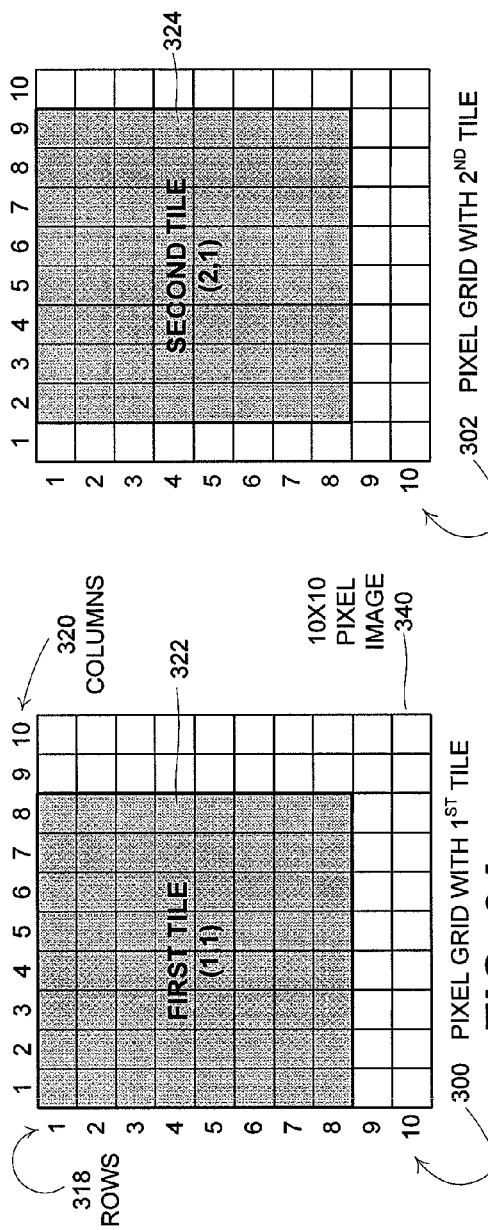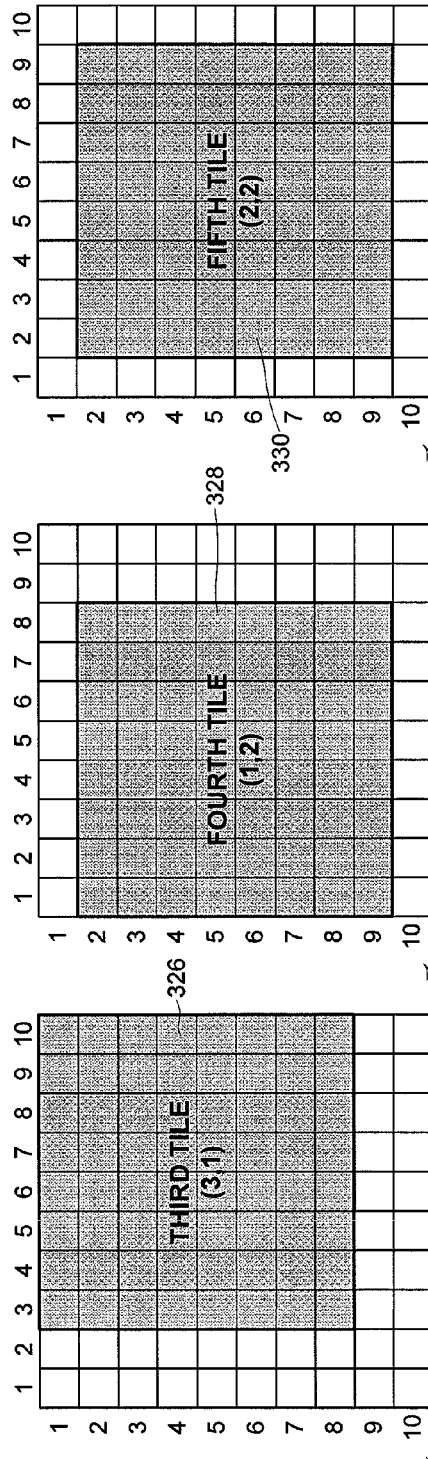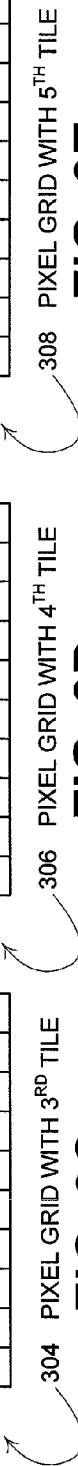
FIG. 3A  PIXEL GRID WITH 1ST TILE
FIG. 3B  PIXEL GRID WITH 2ND TILE
FIG. 3C  PIXEL GRID WITH 3RD TILE
FIG. 3D  PIXEL GRID WITH 4TH TILE
FIG. 3E  PIXEL GRID WITH 5TH TILE

IMAGE ALIGNMENT

STATEMENT REGARDING FEDERAL RIGHTS

This invention was made with government support under Contract No. DE-AC52-06NA25396 awarded by the U.S. Department of Energy. The government has certain rights in the invention.

BACKGROUND OF THE INVENTION

Images obtained by cameras for both still-frame and video cameras are physically limited to a particular size by the lens and other physical attributes/characteristics of the camera taking the image. Thus, one traditional means to expand the size of an image is to adjust the lens and/or other physical attributes of the camera in order to increase the resulting image size. If changing the physical characteristics of the photographic equipment is not feasible, in order to obtain a larger picture size, people have manually spliced images together by visually inspecting images, and then manually aligning and splicing the images together to create a single larger image. To make the manual alignment easier, additional physical devices for steadying the camera and/or moving the camera between images has also been utilized to provide additional uniformity between the images to be aligned.

SUMMARY OF THE INVENTION

An embodiment of the present invention may comprise a method for aligning a first digital image and a second digital image using an electronic computing system comprising: creating by the electronic computing system a plurality of first image tiles for the first digital image and a plurality of second image tiles for the second digital image that are equal sized sub-images of the first digital image and of the second digital image, respectively, each tile of the plurality of first image tiles and of the plurality of second image tiles further containing location information that identifies a pixel location of each tile within the parent first digital image and the parent second digital image, respectively; computing by the electronic computing system first image tile key representations for each first image tile of the plurality of first image tiles and second image tile key representations for each second image tile of the plurality of second image tiles using a frequency-domain transform calculation of each tile; computing by the electronic computing system first image tile pair key differences for each possible pair of first image tiles for the plurality of first image tiles using an information-distance metric calculation; identifying a subset of first image distinguishing feature tiles of the first image that have large discrimination metrics compared to other tiles of the first image based on the computed first image tile pair key differences; comparing by the electronic computing system the first image tile key representations of the subset of first image distinguishing feature tiles of the first image to the second image tile key representations of the plurality of second image tiles; identifying by the electronic computing system from the comparison of the subset of first image tiles to the plurality of second image tiles at least one first image tile key representation of the first digital image that is substantially similar to at least one second image tile key representation of the second digital image; and aligning by the electronic computing system the first digital image with the second digital image based on the identified at least one first image tile and the at least one second image tile that have a substantially similar first image tile key representation and second image tile key representation, respectively, in accord with the pixel location of each tile within the parent first digital image and the parent second digital image, respectively.

An embodiment of the present invention may further comprise an electronic computing system for aligning a first digital image and a second digital image comprising: a tile creation subsystem that creates a plurality of first image tiles for the first digital image and a plurality of second image tiles for the second digital image that are equal sized sub-images of the first digital image and of the second digital image, respectively, each tile of the plurality of first image tiles and of the plurality of second image tiles further containing location information that identifies a pixel location of each tile within the parent first digital image and the parent second digital image, respectively; a tile key representation calculation subsystem that computes first image tile key representations for each first image tile of the plurality of first image tiles and second image tile key representations for each second image tile of the plurality of second image tiles using a frequency-domain transform calculation of each tile; a tile pair difference calculation subsystem that computes first image tile pair key differences for each possible pair of first image tiles for the plurality of first image tiles using an information-distance metric calculation; a distinguishing tile identification subsystem that identifies a subset of first image distinguishing feature tiles of the first image that have large discrimination metrics compared to other tiles of the first image based on the computed first image tile pair key differences; a matching tile subsystem that compares the first image tile key representations of the subset of first image distinguishing feature tiles of the first image to the second image tile key representations of the plurality of second image tiles and identifies from the comparison of the subset of first image tiles to the plurality of second image tiles at least one first image tile key representation of the first digital image that is substantially similar to at least one second image tile key representation of the second digital image; and an image alignment subsystem that aligns the first digital image with the second digital image based on the identified at least one first image tile and the at least one second image tile that have a substantially similar first image tile key representation and second image tile key representation, respectively, in accord with the pixel location of each tile within the parent first digital image and the parent second digital image, respectively.

BRIEF DESCRIPTION OF THE DRAWINGS

In the drawings,

FIG. 2A is a schematic representation of a 10×10 pixel grid representation of a 10×10 pixel image.

FIG. 2B is a schematic representation of an 8×8 pixel tile showing the zig-zag order for frequency-domain coefficients.

FIG. 2C is a schematic representation of the 10×10 pixel grid of FIG. 2A and also showing the location of a first tile sub-image.

FIG. 2D is a line-graph showing Discrete Cosine Transform (DCT) coefficient values versus the zig-zag order of the coefficients for the 8×8 pixel first tile of FIG. 2C.

FIG. 2E is a schematic representation of the 10×10 pixel grid of FIG. 2A and also showing the location of a fifth tile sub-image.

FIG. 2F is a line-graph showing DCT coefficient values versus the zig-zag order of the coefficients for the 8×8 pixel fifth tile of FIG. 2E.

FIGS. 3A-I are schematic representations of a 10×10 pixel grid showing the nine possible 8×8 pixel tiles that may be created as sub-images of the 10×10 pixel grid.

DETAILED DESCRIPTION OF THE EMBODIMENTS

Figure 1A:
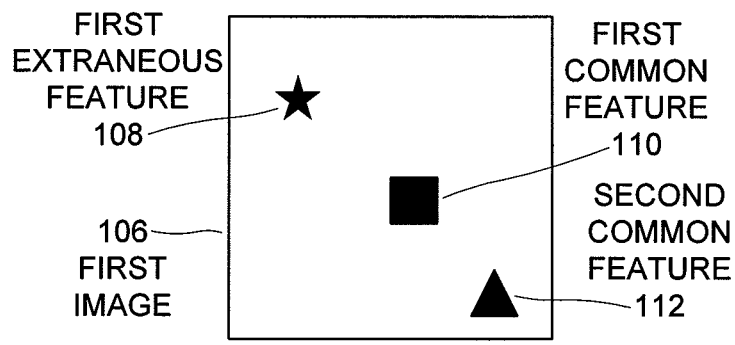
FIG. 1A is a schematic representation of a first image with distinguishing features.

Image alignment may be thought of as a form of image registration. Image registration is typically understood to be a process, or processes, for transforming different sets of data, such as two or more digital images, into one coordinate system, such as aligning and combining two or more digital images into a single image/aligned data digital image data set. Some typical image registration processes may be performed using algorithms that model the geometry/physical characteristics of the camera, location of the camera (e.g., height above the planet for aerial/satellite photography), subject matter of the images (e.g., topography of the planetary surface for aerial/satellite photography), and/or projection of the camera image on the subject matter surface by ray tracing (e.g., ray tracing projection on the planetary surface for aerial/satellite photography). Other typical image registration schemes may depend on identification of visual features of images (e.g., searching for edges within an image—edge detection) to permit image registration/alignment based on the common visual features identified in each of the images being aligned. Further, a typical image registration processes for aerial/satellite photography may stretch and/or distort two-dimensional camera images to conform to a planetary surface.

Video footage may present additional/different problems from the desire to simply obtain a larger single image/resolution than may be permitted using a given camera and possible camera location. Since video is essentially a continuous stream of images, video footage is extremely susceptible to undesired jitter/movement of the camera with respect to the video stream subject matter. For example, when video is captured by a camera located/mounted on a moving vehicle, such as an aircraft or a car driving along a bumpy road, large amounts of jitter/undesired motion may be introduced into the video stream. To properly analyze and view video for various video monitoring applications, it may be essential to try to mitigate the video jitter/motion as much as possible. For instance, it may be highly desirable to have a real-time video feed of a high-speed pursuit police chase stabilized for both police dispatchers/controllers monitoring the pursuit as well as to provide quality footage for the ten o'clock news. In a military setting, it may be highly desirable, and sometimes essential, to stabilize/remove camera jitter from video images taken from an aircraft or other asset (e.g., an airborne wide-area surveillance system) so that the video images may be analyzed in order to tell war fighters (aircraft, ships, and land fighting personnel) in the air, on the sea, and/or on the ground what is coming up around a corner. A typical solution for minimizing/removing camera jitter is to mount the video camera using costly camera gimbals (i.e., stabilization devices), which, many times, do not offer a complete solution.

The various embodiments provide a software solution that may be performed by an electronic computing system, including individual handheld electronic devices (i.e., cell phone, cameras, video cameras, Global Position System-GPS devices, etc.), general purpose computers, dedicated purpose computing platforms, a plurality of networked computers, a plurality of electronic devices, or any individual device/combination of devices capable of providing the necessary computation and computer readable memory resources to perform the image analysis and alignment algorithms disclosed herein. Since the various embodiments implement an algorithm that analyzes the pixels of a digital image, the images provided to an embodiment are necessarily digital images that may have been captured directly by a digital camera/digital video camera, or may be provided from a digital scan/rasterization of a non-digital image. Consequently, digital images for an embodiment may be obtained from digital-camera systems, from individual frames from a sequence of frames from a digital-video system, from digital rasterization of images from analog camera systems, from digital rasterization of frames from analog video systems, and/or from rasterization of a Scalable Vector Graphic (SVG) from a digital-camera or digital-video system. An embodiment may align images of overlapping subject matter by identifying frequency-domain common "features" (i.e., "distinguishing features") found in pixel tile sub-images of each of the aligned images. The alignment of the images may be used to combine two or more images into a single image and/or may be used in a video system to stabilize/remove camera jitter from a video stream by aligning consecutive images in the video stream and stabilizing the stream of video images with respect to a desired common portion/point of the stream of video images. An embodiment may also permit correcting and/or removing distortion at and within the overlapping area between images during the image alignment, combination, and/or video stabilization processes. For instance, an embodiment may provide a video capture system that can capture a fully stabilized video stream on the fly, in real-time as the video images are processed and displayed to a viewer using a camera mounted on a low-end gimbal (i.e., roughly $20,000 or less). An embodiment may use the unique algorithm(s) based on frequency-domain analysis of a-priori-sized tile sub-images of the analyzed image disclosed herein to identify common features of images in order to permit the desired image alignment, image combination, and/or identifying of common features in frames for frame-to-frame image registration for video stabilization. An embodiment may correct for large image-to-image (i.e., frame-to-frame) image translations, correcting pixel translations by as much as 75% of an image diagonal. An embodiment may also work well for large and small images alike, which has been demonstrated in practice with images up to 11 megapixels in size. Further, an embodiment may identify features of images comprised of a potentially large set of pixels based on the relative uniqueness of the large set of pixels within the images, therefore, eliminating errors that may occur in other algorithms caused by either repetitive objects within an image and/or large objects that create large areas of similar texture within an image. Additionally, an embodiment may advantageously achieve the desired image alignment/registration independent of measurements of roll, pitch, and yaw of the camera that may be required for other algorithms, thus, eliminating the equipment size, weight and power requirements to obtain the roll, pitch, and yaw measurements that may be necessary using other algorithms. Accordingly, various embodiments may be particularly well suited to applications for video and/or SVG (Scalable Vector Graphic) systems.

To achieve the desired image alignment/registration, an embodiment may identify features within a two-dimensional rectangular sub-image tile of pixels within an image based on a frequency-domain (aka. frequency-space) transformation of the pixels within the two-dimensional tile. One frequency-domain transformation calculation that may be utilized by an embodiment is the Discrete Cosine Transform (DCT). An embodiment may scan each image being aligned/registered to create a-priori-sized (i.e., a previously known equal fixed size) rectangular tiles of pixels that are each a subset of the parent image pixels (i.e., are sub-images of the parent image). One embodiment may create all possible complete tiles for the defined tile size for an image in order to ensure that all potential features of an image may be identified. Other embodiments may select particular tiles to create and analyze, perhaps based on some knowledge of where particularly distinguishing features may be found within images. An embodiment may store location information of the location of the tile within the parent image for use in later alignment of images based on tiles in each of the images determined to show similar image features. For instance, one embodiment may simply identify (e.g., name) each tile based on the upper left corner pixel location of the tile within the parent image. Tiles may be scanned/created from an image in any order desired by a system designer, but one effective order has been found to be incrementing pixel row and/or columns of the tile starting location (e.g., upper left tile corner) by one until all possible tiles are created. Note that to achieve good identification of features, it is necessary to have all possible complete tiles of an image, including overlapping tiles (see the disclosure below with respect to FIGS. 3A-I), so that features distinguished by a difference between as few as two pixels may be properly identified. A complete tile is a tile where all pixels in the tile represent pixels from the parent image such that "blank" pixels are not incorporated into the image if the tile is located too close to the edge of the parent image to permit all pixels in the tile to be obtained from the parent image. Thus, for an image containing N×M pixels, and with rectangular tiles of width W pixels and height H pixels, there would be (N+1−W)×(M+1−H) complete tiles for the image.

Once the desired tiles are created for the images, an embodiment may then calculate the frequency-domain transform (e.g., one of the DCT variations, Fourier Transform, etc.) for each tile of each image. An embodiment may then arrange the two-dimensional frequency-domain transform coefficients into a one-dimensional vector. One potential one-dimensional vector form for the two-dimensional frequency-domain transform coefficients is to place the frequency-domain transform coefficients in zig-zag order. Zig-zag order indicates a similar zig-zag order for frequency-domain coefficients as is a commonly understood aspect of the DCT analysis for JPEG (Joint Photographic Experts Group) image compression. An embodiment may then compare the one-dimensional vector of coefficients of each tile on an image to the one-dimensional vector of each other tile on the image using one of many known information-distance metric calculations. Some examples of information-distance metric calculations include, but are not limited to: Aggregate Absolute Difference by Coefficient (AADBC), variational distance, and the Kullback-Leibler distance. An embodiment may then identify tiles on each image that have large discrimination metrics (i.e., that have maximal information-distance results) with respect to the other tiles of the image. The tiles with the large discrimination metrics as compared to other tiles on the image may then be determined to be "distinguishing" feature tiles that identify potential alignment features for an image recognizing that identified tiles of pixels are both different and unique from other tiles on each image. An embodiment may select a predefined number (i.e., K) of the most differentiable tiles from a first image as a subset of K tiles of each image in order to compare to the distinguishing tiles of each image with the distinguishing tiles of other image in order to attempt to find a substantially similar match of distinguishing tiles for each image that may then be used to align the first image to the one or more other images. If a match for at least one of the best K distinguishing tiles from the first image is not found within the second image, the next best K distinguishing feature tiles from one or both of the first and second images may be compared for a match of features between the images, and this process may be repeated until a match of features between distinguishing tiles of the first and second image is found or the selected tiles are determined to have too small of a discrimination metric with respect to other tiles to be considered a distinguishing feature tile. An embodiment that aligns images using the identified subset of "distinguishing" feature tiles may be considered to be aligned to match within and at the edges of the overlapping areas of the images.

Figure 1B:
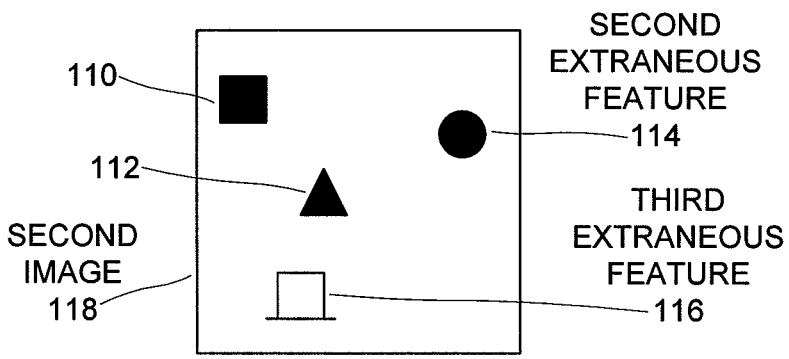
FIG. 1B is a schematic representation of a second image with distinguishing features.
Figure 1C:
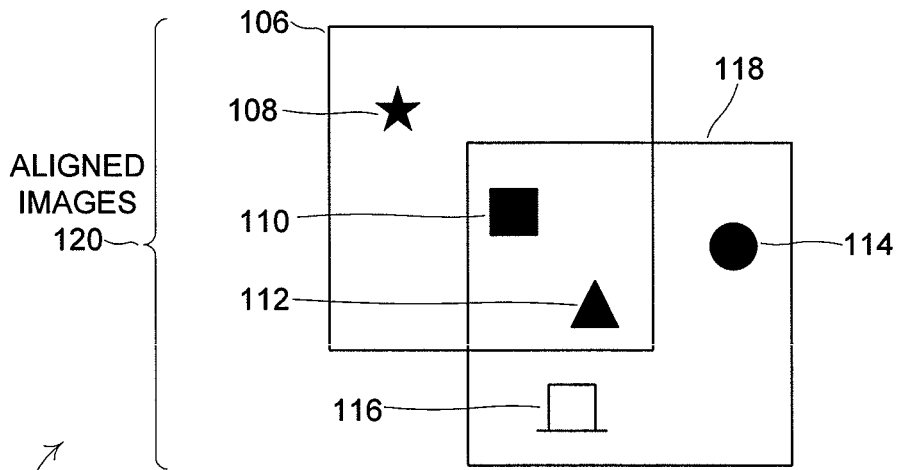
FIG. 1C is a schematic representation of the first and second images of FIGS. 1A & B aligned via common distinguishing features.

FIGS. 1A-C are schematic representations 100-104 of two simple individual images 106, 118 being aligned 120 via common distinguishing features 110, 112. FIG. 1A is a schematic representation 100 of a first image 106 with distinguishing features 110-114. FIG. 1B is a schematic representation 102 of a second image 118 with distinguishing features 112-116. FIG. 1C is a schematic representation 104 of the first 106 and second 118 images of FIGS. 1A & B aligned 120 via common distinguishing features 110, 112. The first image 106 may represent a digital image taken by a digital camera. The digital camera may then be panned right, left, up or down before taking the second image 118. In order for an embodiment to align the first image 106 with the second image 118, some amount of each image 106, 118 will need to show the same subject matter so that "common" features 110, 112 may be located in each image 106, 118 and aligned 120 onto a common pixel coordinate system between the images 106, 118. While it is desirable to take the images 106, 118 to be aligned 120 with the same camera and relatively close in time (i.e., seconds to several minutes apart), an embodiment may still successfully align images if the image resolution with regard to the subject matter (i.e., the number of pixels per unit area of image subject matter—e.g., pixels per square meter) and the lighting conditions of the images (i.e., light source location for similar shadows, color/grayscale matching between images 106, 118, etc.) were similar to what the image characteristics would be for two successive images taken seconds to several minutes apart by the same camera using the same camera settings from the same location with the camera panned left, right, up and/or down between images. Accordingly, while more difficult to ensure similar image characteristics, images 106, 118 may be taken by different cameras on different days provided that the resulting images 106, 118 provide similar image characteristics. Image characteristics may be affected by the physical/software characteristics and settings of the cameras taking the images 106, 118, including, but not limited to: pixel resolution of the camera (typically measured in Megapixels), spatial resolution, spectral resolution, temporal resolution, radiometric resolution, F-stop/focal ratio, physical camera lens, zoom settings, lens aperture, focal length, shutter speed, film type for non-digital images to be scanned, scanner settings for scanned images, etc. The images 106, 118 also should be taken, or at least share subject matter characteristics as if the images 106, 118 as if the images 106, 118 were taken from the same geometric location with regard to the image subject matter and at the same time of day and/or otherwise with the same geometry for lighting such that color, light intensity, and shading are similar between the images 106, 118 to be aligned. It may also be desirable for the images 106, 118 to be aligned to have image subject matter that is distant scenes (i.e., distant subject matter) so that near-field distortions due to camera movement may be minimized.

The images 106, 118 shown in FIGS. 1A-C provide a visual example of the high-level concept of image alignment 120. The first image 106 may be a digital image taken by a camera. After an embodiment analyzes the pixels of the first image 106 using frequency-domain transforms of a smaller, fixed size tiles, an embodiment may identify three "distinguishing" features 108-112. The second image 118 may be a digital image taken by the same camera that took the first image 106 where the camera has been panned left, right, up and/or down. After an embodiment analyzes the pixels of the second image 118 using frequency-domain transforms of the same size of fixed size tiles as for the first image 106, an embodiment may identify four "distinguishing" features 110-116. After an embodiment analyzes the distinguishing features 108-116 in each image 106, 118, the embodiment may determine that there are two distinguishing features 110, 112 that are common to both images 106, 118. The remaining features 108, 114, 116 are not shared by the images 106, 118 and are, therefore, "extraneous" with regard to the alignment process and may be ignored. A goal of an embodiment may be to align 120 the two images 106, 118. With the pixel location of the similar/common features 110, 112 known within each of the images 106, 118, an embodiment may align the two images 106, 118 with each other by aligning the common distinguishing features 110, 112 of each of the images together into a single, shared pixel coordinate system. Accordingly, the two images 106, 118 are aligned pixel by pixel such that the pixels common to both images 106, 118 match/align in pixel space, and the pixels unique to only one of the images 106, 118 form a composite in pixel space bigger than either of the single images 106, 118 alone.

An embodiment may use pixel-composite metrics, such as the Discrete-Cosine Transform (DCT) methods used to compress multi-pixel tiles in JPEG images, in order to identify features in a first image that may be discriminated from other analogous features elsewhere within the first image. A similar analysis of features may be performed for a second image such that features identified in the second image may be discriminated from other features in the second image. The discriminated (i.e., distinguishing) features found in the first image may be compared to the discriminated (i.e., distinguishing) features found in the second image and distinguishing features from the first image that are found to match distinguishing features from the second image may then produce a basis for automated alignment of the two images.

FIGS. 2A-F are schematic representations 200, 202, 204, 208 and graphs 206, 210 that describe operation of an example embodiment that uses JPEG-like tile metrics to analyze an image to locate a machine-recognizable distinguishing feature in an image. FIG. 2A is a schematic representation 200 of a 10×10 pixel grid representation 220 of a 10×10 pixel image. An object 218 appears on the 10×10 pixel grid 220 as the dark squares 218 of the pixel grid 220. As noted at 212, in the actual digital image, the filled in pixels 218 would appear as a seamless, continuous object without the white spacing providing in FIGS. 2A, C, & E that are included so that it is easier to see the superimposed pixel grid 220. The pixel grid 220 shows the rows 214 and columns 216 of the pixels of the image shown on the pixel grid 220. Thus, each pixel in the pixel grid 220 may be individually identified by row 214 and column 216. It should also be noted that a 10×10 pixel image 220 is only a 100 pixel image, which is an extremely small image for a typical camera. For instance, a 640×480 image (i.e., 307,200 pixels) is generally considered a relatively small picture, while many current cameras may support a pixel resolution of 10 Mega-pixels (i.e., 3888×2592 which is 10,077,696 pixels) or even more. The technology trend has been for cameras to obtain ever higher pixel resolution images, so, within a few years, it may be that even a 10 Mega-pixel image is considered relatively small. The small 10×10 pixel image 220 shown for FIGS. 2A, B & D is shown to permit a human viewer to quickly understand the concepts of an embodiment since a larger file size would only require more repetition of the same concepts performed on the smaller image 220.

A JPEG DCT image compression process operates on 8×8 pixel tiles (i.e., 8×8 pixel sub-images of an image) to produce a Fourier-transform-like representation of the tiles in frequency-space (i.e., in the frequency-domain). One reason that the DCT representation works well for JPEG compression is that most amplitudes in the frequency-domain are in the low-frequency components, with coefficients for higher frequencies rapidly going toward zero as frequency increases. JPEG compression actually takes minimization of the high frequency coefficients a step further by recognizing that high frequencies are less important than low frequencies for human perception, so nearly-zero high frequency coefficients may be thrown away for improved JPEG compression. JPEG compression may also coarsely quantize DCT coefficients to reduce magnitudes of coefficients with minimal, or acceptable, distortion for human perception of the image, while permitting a smaller image file size. JPEG compression may further arrange the quantized components in zig-zag 224 order as a vector for Huffman compression.

FIG. 2B is a schematic representation 202 of an 8×8 pixel tile 222 showing the zig-zag order 224 for frequency-domain coefficients. One skilled in the art will recognize and understand the zig-zag order 224 of coefficients as implemented in the well known JPEG compression algorithm. Thus, only minimal coverage of the zig-zag 224 order of coefficients is incorporated herein as a more complete explanation may take significant disclosure and the numerous descriptions of JPEG compression describe the zig-zag order 224 much better than may be presented herein. The zig-zag order 224 is generally understood to order the coefficients of the frequency domain order as shown by zig-zag line 224 for the 8×8 pixel tile 222 of FIG. 2B. One skilled in the art will recognize that a similar zig-zag order 224 may be applied to pixel tiles that are both smaller and larger than the 8×8 tile 222 shown in FIG. 2B, as well as to rectangular, but not square, tiles. If a reader requires a further explanation of the zig-zag order 224 of coefficients, it is recommended that the reader explore the documentation with regard to the DCT analysis performed for JPEG compression of image data. Beyond the concept of zig-zag order 224, and the use of 8×8 sized tiles for the example embodiments shown herein, the elements of the JPEG algorithm discussed above are not concerns of great consequence to the embodiments disclosed herein. One skilled in the art will recognize that, while the 8×8 tile size is convenient and used in the art by the common JPEG compression format, other rectangular tile sizes may also be used for various embodiments.

FIG. 2C is a schematic representation 204 of the 10×10 pixel grid 220 of FIG. 2A and also showing the location of a first tile sub-image 226. The first tile sub-image 226 shown in FIG. 2C is identified as the first (1,1) tile 226 in order to match the identification given for the possible 8×8 tiles for a 10×10 grid shown in FIGS. 3A-I that is similar to pixel grid 220 of FIGS. 2A, C & E. As noted on the first (1,1) tile 226, the location of the upper left corner of the first tile 226 within the image 220 is at the first column 216 and first row 214, or (1,1). The first tile 226 may be named based on location (i.e., 1,1) within the image 220, or may otherwise include the location information (i.e., 1,1) so that the location of the first tile 226 may later be used to align the image 220 with another image. As may be observed in FIG. 2C, a portion of the object 218 in the image 220 is included in the first (1,1) tile 226 (i.e., the 6×6 square of pixels from 3,3 to 8,8 portion of object 218).

FIG. 2D is a line-graph 206 showing Discrete Cosine Transform (DCT) coefficient values 228, 232 versus the zig-zag order of the coefficients 230 for the 8×8 pixel first tile 226 of FIG. 2C. For the example embodiment of FIGS. 2A-F, the selected frequency-domain transform is a DCT calculation, specifically a non-quantized DCT. Other frequency-domain transform calculations may be used by other embodiments, such as other forms of DCT, Fourier-transform, etc. For the first (1,1) tile 226 of FIG. 2C, the one-dimensional vector graph of the non-quantized DCT coefficients for the first (1,1) tile 226 may appear like graph line 232 in an X-Y graph of the DCT coefficient amplitude 228 versus the zig-zag order from 0 to 63 for an 8×8 pixel tile.

FIG. 2E is a schematic representation 208 of the 10×10 pixel grid 220 of FIG. 2A and also showing the location of a fifth tile sub-image 234. The fifth tile sub-image 234 shown in FIG. 2E is identified as the fifth (2,2) tile 234 in order to match the identification given for the possible 8×8 tiles for a 10×10 grid shown in FIGS. 3A-I that is similar to pixel grid 220 of FIGS. 2A, C & E. As noted on the fifth (2,2) tile 234, the location of the upper left corner of the fifth tile 234 within the image 220 is at the second column 216 and second row 214, or (2,2). As described for the first (1,1) tile 226 above, the fifth tile 234 may be named based on location (i.e., 2,2) within the image 220, or may otherwise include the location information (i.e., 2,2) so that the location of the fifth tile 234 may later be used to align the image 220 with another image. As may be observed in FIG. 2E, the whole of the object 218 in the image 220 is included in the fifth (2,2) tile 234, making the contents of the fifth (2,2) tile 234 different from the contents of the first (1,1) tile 226 of FIG. 2C, even though the tiles 226, 234 only differ in location by one pixel column 216 and one pixel row 214.

FIG. 2F is a line-graph 210 showing DCT coefficient values 228, 236 versus the zig-zag order of the coefficients 230 for the 8×8 pixel fifth tile 234 of FIG. 2E. As also noted above, for the example embodiment of FIGS. 2A-F, the selected frequency-domain transform is a DCT calculation, specifically a non-quantized DCT, but other frequency-domain transform calculations may be used by other embodiments, such as other forms of DCT, Fourier-transform, etc. For the fifth (2,2) tile 234 of FIG. 2E, the one-dimensional vector graph of the non-quantized DCT coefficients for the fifth (2,2) tile 234 may appear like graph line 236 in an X-Y graph of the DCT coefficient amplitude 228 versus the zig-zag order from 0 to 63 for an 8×8 pixel tile.

Note that the graph of non-quantized DCT coefficients 236 for the fifth (2,2) tile 234 is much difference in appearance from the graph of non-quantized DCT coefficients 232 for the first (1,1) tile 226. Further note that the Zig-Zag non-quantized DCT (ZZDCT) 232, 236 of FIGS. 2D & E appear much like the edge of the profile of typical house keys. The name for the edge of a house key (or any similar physical key) is the "key cut." As is well known, the uniqueness of a key cut for a physical key is the aspect of the typical physical key that provides security for the locking mechanism associated with the physical key, and the key cut of the physical key serves to map the identity of the physical key with the associated locking mechanism of the physical key as well as to discriminate/distinguish the physical key against other physical keys and/or locking mechanisms. Analogously, the ZZDCT 232, 236 of an 8×8 tile 226, 234 of an image 220 may be used by an embodiment to uniquely identify each 8×8 tile 226, 234 of an image and discriminate/distinguish each 8×8 tile 226, 234 against other 8×8 tiles 234, 226 of an image 220. As applied to FIGS. 2A-F, the ZZDCT 232 of the first (1,1) tile 226 and the ZZDCT 236 of the fifth (2,2) tile 234 may be used to discriminate/distinguish the first (1,1) tile 226 from the fifth (2,2) tile 234 of the image 220. Thus, it is hoped that at least a subset of tiles 226, 232 have a ZZDCT 232, 236 that is substantially different from the ZZDCT 232, 236 of other tiles of an image in order to discriminate/distinguish the subset of tiles 226, 234 from the other tiles 226, 234 of the image 220, as is the case shown in FIGS. 2A-F for the ZZDCT 232, 236 of the first (1,1) tile 226 and fifth tile 234 of the image 220.

Once the ZZDCT 232, 236 for each tile 226, 234 is calculated/created, the embodiment of FIGS. 2A-F needs to distinguish the ZZDCTs 232, 236 from each other in order to distinguish one tile 226, 234 from another tile 234, 226 of the image 220. One skilled in the art will recognize that there are many means of measuring the differences between the ZZDCT keys 232, 236 of the tiles 226, 234. One skilled in the art will further recognize that the potential ZZDCT 232, 23 difference measuring calculations resemble, among other things, the calculations of stochastic information distances between two probability-density functions in the field of mathematical statistics. Some examples of information-distance metric calculations include, but are not limited to: Aggregate Absolute Difference by Coefficient (AADBC), variational distance, and the Kullback-Leibler distance. For the embodiment of FIGS. 2A-F, a designer might select the AADBC to measure the difference between tile 226, 234 frequency-domain key representations 232, 236. The formula for the AADBC appears as Eq. 1 below where $K_1$ and $K_2$ are the ZZDCT key representations 232, 236 for two potentially different 8×8 tiles 226, 234 and i is the index that runs through the potential frequency components of the ZZDCT key representations in zig-zag order 224, which has a range of 0 to 63 for the DCT coefficients 232, 236 of an 8×8 tile of pixels 226, 234.

$$AADBC = \sum_{i=0}^{63} |K_1(i) - K_2(i)| \qquad \text{Eq. 1}$$

As noted above, for an image containing N×M pixels, and with rectangular tiles of width W pixels and height H pixels, Eq. 2 below represents the number of complete, unique (i.e., distinct) tiles that may be created for an image.

$$(N+1-W) \times (M+1-H) \qquad \text{Eq. 2:}$$

For an embodiment using 8×8 pixel tiles, Eq. 3 below represents the number of complete, unique 8×8 tiles for an image.

$$(N-7) \times (M-7) \qquad \text{Eq. 3:}$$

Thus, for the 10×10 image 220 of FIGS. 2A, C & E, there would be 9 possible distinct tiles (see the disclosure with respect to FIGS. 3A-I below). For the embodiment disclosed with respect to FIGS. 2-F, the AADBC of Eq. 1 above (or possibly some other information-distance calculation for other embodiments) may be calculated for each potential pair of tiles 226, 232 for the image 220. To simplify the discussion, only two tiles 226, 234 (see FIGS. 2C & E), or one tile pair 226, 234, have been presented for the discussion of the differences between image 220 tiles 226, 234. For an embodiment, however, a difference metric may be computed for each tile pair of an image (i.e., between each tile of an image and each other distinct tile of the image). Using the same variables as for Eq. 2 above, the potential number of tile pairs is given by Eq. 4 below.

$$\binom{(N+1-W) \times (M+1-H)}{2} = \frac{[(N+1-W) \times (M+1-H)] \times \{[(N+1-W) \times (M+1-H)]-1\}}{2} \qquad \text{Eq. 4}$$

For an embodiment using 8×8 pixel tiles, Eq. 5 below represents the number of potential, distinct/unique tile pairs for an image.

$$\binom{(N-7) \times (M-7)}{2} = \frac{[(N-7) \times (M-7)] \times \{[(N-7) \times (M-7)]-1\}}{2} \qquad \text{Eq. 5}$$

Thus, for the 10×10 image 220 of FIGS. 2A, C & E, there would be 36 possible distinct tile pairs (see also the disclosure with respect to FIGS. 3A-I below). Note that each difference metric for a tile pair is a scalar, not matrix/vector, value. That is, the 8×8 matrix of pixels (i.e., first 226 and fifth 234 tiles) has been reduced to a 64 element vector (i.e., ZZDCTs 232, 236 for the first 226 and fifth 234 tiles), and finally reduced to the scalar information-distance value resulting from the AADBC (i.e., Eq. 1 above).

Using information-distance type calculations, there will emerge from the overall set of tile pairs (e.g., first 226 and fifth 234 tiles making up a single tile pair), a subset of tiles that have large discrimination metrics which may be considered distinguishing feature tiles for the image 220. For instance, a subset of distinguishing feature tiles may be comprised of the K tiles of an image 220 that have the largest discrimination metric, the largest average metric, and/or the largest minimal metric among all of the potential distinct tile pairs involving those K tiles. For the embodiment of FIGS. 2A-F, a system designer may define the subset of distinguishing feature tiles such that the number of tiles K in the subset of distinguishing feature tiles is four. As already alluded to, this subset of K (in this embodiment 4) tiles then becomes a set of features that comprise the most-distinguishable tiles for an image 220 (i.e., a set of distinguishable feature tiles).

A similar analysis of a second image may be performed and the distinguishable feature tiles of the second image may be compared with the distinguishable feature tiles of the original image 220. If a distinguishing feature tile from the second image matches/is substantially similar to a distinguishing feature tile from the first image 220, the first 220 and second image may be aligned using the tile pixel location information within the parent image stored with each tile (e.g., stored as part of the name for each tile) to correlate the first 220 and second image with each other. See also, for example, the disclosure with respect to FIGS. 4A-C below. The combined/aligned first and second image may further be compared/aligned with additional images using a similar analysis using either the already calculated distinguishing feature results for the images or by re-performing the tile pair difference analysis for the combined/aligned image of the first 220 and second image as a new/unique image. An additional check/verification of the alignment of the images may be performed by locating one or more additional distinguishing feature tiles that match between the first and second image and verifying that an inter-tile geometric relationship between the distinguishing tiles on the first image matches the inter-tile relationship between the matching/substantially similar tiles on the second image. See also, for example, the disclosure with respect to FIGS. 5A-C below. If the inter-tile geometry of the one or more additional matching/substantially similar distinguishing tiles of the first and second image match/are substantially similar, then the alignment is verified. If the inter-tile geometry of the one or more additional matching/substantially similar distinguishing tiles of the first and second image do not match/are not substantially similar, then the proposed alignment is not verified and an embodiment may eliminate the unverified tile match and look for other distinguishing tiles that match/are substantially similar between the two images to make another alignment attempt. Further, if a distinguishing tile match/substantially similar distinguishing tiles cannot be found between the images, a new set of distinguishing tiles (i.e., a new subset of tiles from the image that are considered to be distinguishing feature tiles) may be designated for either one, or both of the images until a match/substantially similar distinguishing tile is found for either the aligning tiles and/or for any verifying tiles. To ensure all possible matches are investigated, an embodiment may first obtain the additional subset of distinguishing tiles on the first image, compare the additional subset of distinguishing tiles for the first image to the original subset of distinguishing tiles for the second image, then, if no matches are found, obtain an additional subset of distinguishing tiles for the second image and repeat the update of distinguishing tiles from first image to second image until all tiles of the first image have been tried. To avoid false positives, an embodiment may also limit the potential distinguishing features to features that have discrimination metrics that are above a threshold set by a system designer that would effectively avoid false positive matches. Further, to avoid extra calculations, an embodiment may skip the calculation of tile differences and the following analysis of the discrimination metrics necessary to locate distinguishing feature tiles on the second image. Instead, an embodiment may simply search all of the frequency domain tile key representations of the second image for a match/substantially similar tile to the distinguishing feature tiles of the first image based on the frequency domain tile key representation, but there is an additional possibility for false positives if comparisons between the tiles of the aligned images is not limited to tiles that are considered distinguishing features in both images instead of just the first image.

Figure 3F:
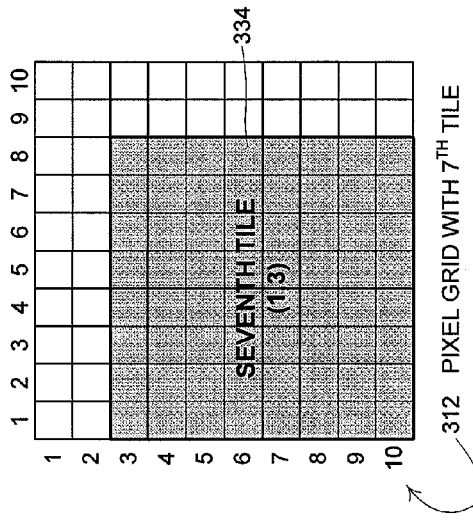
Figure 3G:
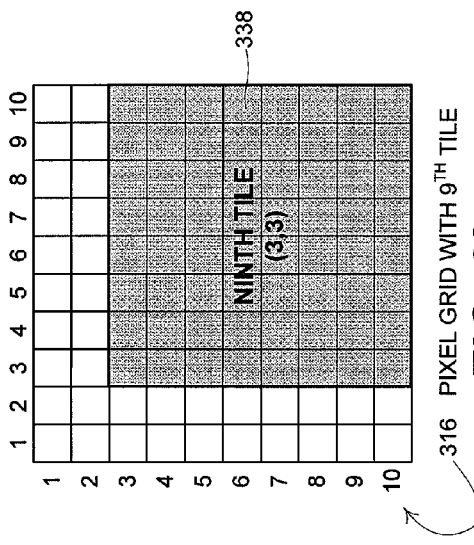
Figure 3H:
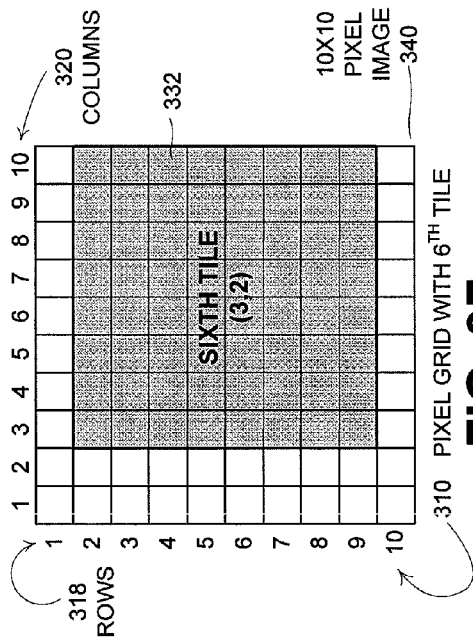
Figure 3I:
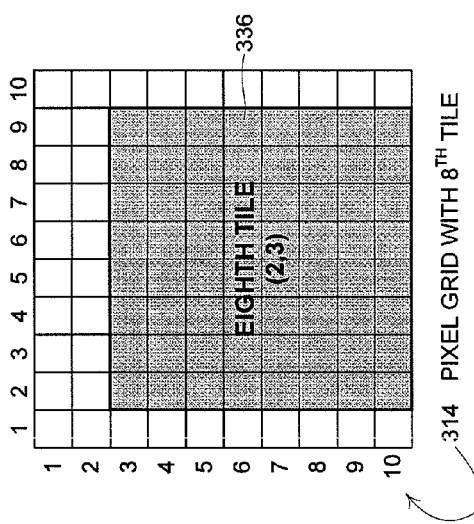

FIGS. 3A-I are schematic representations 300-316 of a 10×10 pixel grid 340 showing the nine possible 8×8 pixel tiles 322-338 that may be created as sub-images 322-338 of the 10×10 pixel grid 340. FIG. 3A is a schematic representation 300 of the first 8×8 pixel tile 322 of the nine possible complete 8×8 pixel tiles 322-338 that may be created from the 10×10 pixel image 340. The 10×10 pixel image 340 has a grid of the pixels shown with columns 320 and rows 318 designated to define a location for each pixel in the 10×10 pixel (i.e., 100 pixel) image 340. In addition to designating tiles as first, second, etc., an embodiment may name/designate tiles according to the location of the upper left pixel of each 8×8 pixel tile 322-338 within the overall 10×10 pixel image 340. Regardless of how the pixel location of each pixel tile 322-338 within the overall image 340 is formatted and recorded, each tile 322-338 needs to be able to define the location of the tile 322-338 within the parent image 340 in order to align the parent image with another image based on the location of matching/substantially similar distinguishing tiles on each of the aligned images. Thus, the first 8×8 tile 322 may also be named/designated by the upper left pixel location of column 320 number one and row 318 number one or (1,1). Accordingly, by adjusting the starting location of the each tile 322-338 by one pixel for a column 320 or one pixel for a row 318, FIG. 3B is a schematic representation 302 of the second 8×8 pixel tile 324 of the nine possible complete 8×8 pixel tiles 322-338 that may be created from the 10×10 pixel image 340 where the second pixel tile 324 has an upper left corner pixel identified as (2,1) within the overall parent image 340. FIG. 3C is a schematic representation 304 of the third 8×8 pixel tile 326 of the nine possible complete 8×8 pixel tiles 322-338 that may be created from the 10×10 pixel image 340 where the third pixel tile 326 has an upper left corner pixel identified as (3,1) within the overall parent image 340. FIG. 3D is a schematic representation 306 of the fourth 8×8 pixel tile 328 of the nine possible complete 8×8 pixel tiles 322-338 that may be created from the 10×10 pixel image 340 where the fourth pixel tile 328 has an upper left corner pixel identified as (2,1) within the overall parent image 340. FIG. 3E is a schematic representation 308 of the fifth 8×8 pixel tile 330 of the nine possible complete 8×8 pixel tiles 322-338 that may be created from the 10×10 pixel image 340 where the fifth pixel tile 330 has an upper left corner pixel identified as (2,2) within the overall parent image 340. FIG. 3F is a schematic representation 310 of the sixth 8×8 pixel tile 332 of the nine possible complete 8×8 pixel tiles 322-338 that may be created from the 10×10 pixel image 340 where the sixth pixel tile 332 has an upper left corner pixel identified as (2,3) within the overall parent image 340. FIG. 3G is a schematic representation 312 of the seventh 8×8 pixel tile 334 of the nine possible complete 8×8 pixel tiles 322-338 that may be created from the 10×10 pixel image 340 where the seventh pixel tile 330 has an upper left corner pixel identified as (3,1) within the overall parent image 340. FIG. 3H is a schematic representation 314 of the eighth 8×8 pixel tile 336 of the nine possible complete 8×8 pixel tiles 322-338 that may be created from the 10×10 pixel image 340 where the eighth pixel tile 336 has an upper left corner pixel identified as (3,2) within the overall parent image 340. FIG. 3I is a schematic representation 316 of the ninth 8×8 pixel tile 336 of the nine possible complete 8×8 pixel tiles 322-338 that may be created from the 10×10 pixel image 340 where the ninth pixel tile 336 has an upper left corner pixel identified as (3,3) within the overall parent image 340. Note that for the embodiment disclosed with respect to FIGS. 2A-F above, the two tiles shown in FIGS. 2C & 2E represent the first (1,1) tile 322 and the fifth (1,2) tile 330, respectively.

Figure 4A:
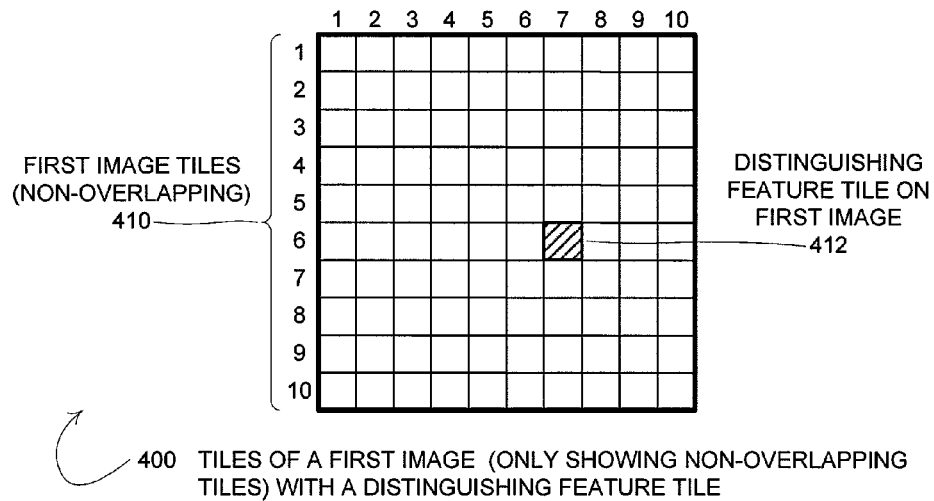
FIG. 4A is a schematic representation of one layer of 10×10 tiles showing a distinguishing feature tile for a first image.
Figure 4B:
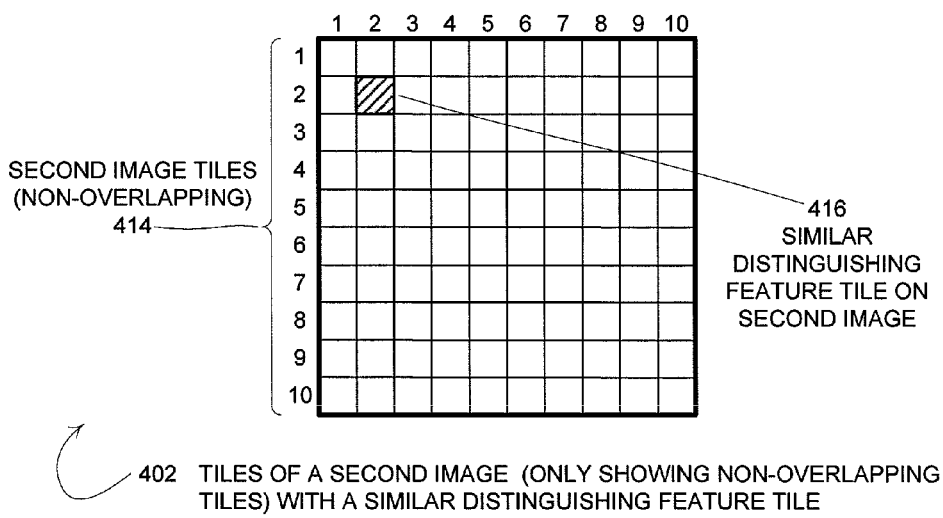
FIG. 4B is schematic representation of one layer of 10×10 tiles showing a similar distinguishing feature tile for a second image.
Figure 4C:
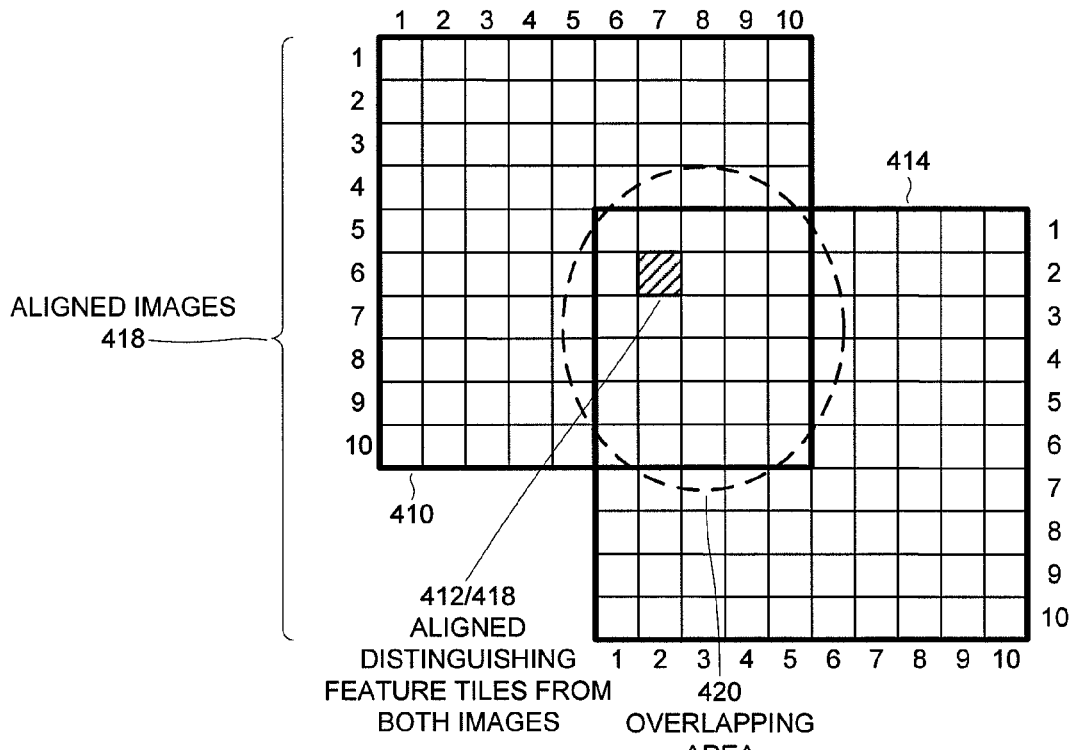
FIG. 4C is schematic representation of the first and second images of FIGS. 4A & B aligned via the common/similar distinguishing feature tiles.

FIG. 4A is a schematic representation 400 of one layer of 10×10 tiles 410 showing a distinguishing feature tile 412 for a first image 410. In the first note 406 for FIGS. 4A-C, it is noted that only non-overlapping tiles of a single layer of tiles 410 for an image 410 are shown since it is not possible to effectively convey the many over-lapping layers of potential tiles in a single two-dimensional drawing. Accordingly, one skilled in the art will recognize that there are potentially many, many more potential tiles and that the 10×10 grid of tiles 410 is shown to give a visual understanding of the alignment of two images once at least one distinguishing feature 412 tile is located by an embodiment (see, for example, the disclosure with respect to FIGS. 2A-F for a more detailed description of the process for finding a distinguishing feature tile for one embodiment). One skilled in the art will also recognize that the 10×10 tile grids 410, 414 shown in FIGS. 4A-C represent 10×10 tiles of pixels and not 10×10 pixels as was the case for FIGS. 2A-F and 3A-I. Thus, assuming tiles are 8×8 pixels, the images 410, 414 would be made up of 80×80 pixels (6400 pixels). Further, using Eq. 3 disclosed above to calculate the number of 8×8 pixel tiles for an 80×80 pixel image results in the understanding that there are 5329 possible complete 8×8 pixel tiles for an 80×80 pixel image, of which, only 100 tiles are shown in the single 10×10 tile layer shown for FIGS. 4A-C. With the understanding that only a very small number of the potential tiles for a first image 410 are shown, an embodiment may use the frequency-domain transform calculation on each tile of the first image 410 to create a frequency-domain first image tile key representation for each first image tile. An embodiment may then use the information-distance calculation to calculate a difference for the first image frequency-domain tile key representation of each first image tile from each other first image frequency-domain tile key representation of each other first image tile. The embodiment may then analyze the resulting discrimination metrics of the information-distance calculations in order to locate at least one distinguishing feature tile 412 that has the largest discrimination metrics for the tiles on the first image 410.

FIG. 4B is schematic representation 402 of one layer of 10×10 tiles showing a similar distinguishing feature tile 416 for a second image 414. A similar tile difference/distinguishing tile analysis as described for the first image 410 above may be performed on the second image 414 in order to locate distinguishing feature tiles 416 on the second image 414. The distinguishing tiles 412, 416 of the first image 410 and the second image 414 may be compared until a tile 416 on the second image 414 that is matching/substantially similar to one of the distinguishing feature tiles 412 on the first image 410 is found. Other embodiments may skip the analysis of tile differences for the second image 414 (i.e., the information-distance calculation and associated discrimination metric analysis for each second image tile) and simply locate a tile 416 within the second image 414 that has a matching/substantially similar frequency-space tile key representation as the identified distinguishing tile 412 of the first image 410, but a false positive is more likely if the distinguishing feature analysis is not utilized to narrow the field of second image tiles available for comparison.

FIG. 4C is schematic representation 404 of the first 410 and second 414 images of FIGS. 4A & B aligned via the common/similar distinguishing feature tiles 412/416. With a distinguishing tile 412 identified in the first image 410 and a similar distinguishing tile 416 found in the second image 414, an embodiment may then align 418 the first 410 and second 412 images with each other based on the substantially similar distinguishing feature tiles 412/416 of the two images 410/414 as shown in FIG. 4C. As the second note 408 states, for illustration purposes, the alignment shown in FIG. 4C is based off of the tile location within the single layer of tiles (see the first note 406) rather than explicitly based off of the pixel location identified for each tile in the images 410, 414 as would more likely be performed by an embodiment. While it is possible to align the images 410, 414 based on the location of the tiles 412/416, the location of the tiles 412/416 is a function of the pixel location identified for each tile 412/416 within the parent image 410, 414, so location of the tiles 412/416 is essentially the same as locating the tiles 412/416 based on the pixel location of the tile 412/416 within a parent image 410, 414. As described above, each tile of an embodiment may identify (e.g., by name, by inclusion in a tile data structure, a separate cross-reference list, or otherwise linked to the tile) the pixel location of the tile 412/416 within the parent image 410, 414 such that the alignment of the first 410 and second 414 images may be based on a combination of the images 410, 414 into a single coordinate system with the distinguishing feature tiles 412/416 aligned on a pixel-by-pixel basis so the two images 410, 414 are aligned 418 within and at the edges of the overlapping areas 420 of the images 410, 414. Once aligned, the images 410, 414 may be used for a variety of purposes, including creating a larger continuous image 418 of the two individual images 410, 414, stabilizing video images based on the alignment 418 between two or more consecutive images 410, 414, etc.

Figure 5A:
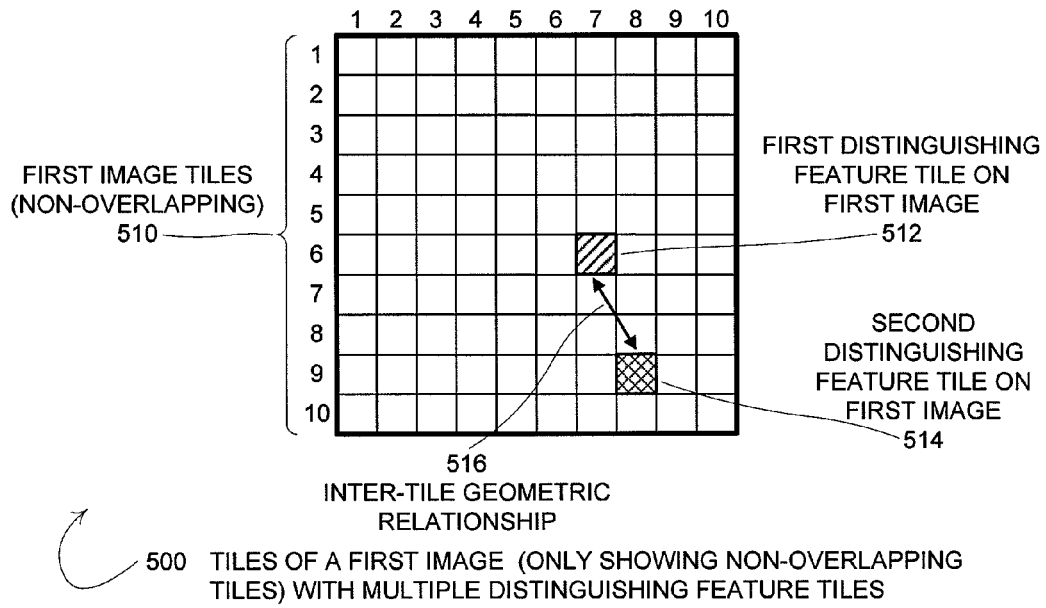
FIG. 5A is a schematic representation of one layer of 10×10 tiles showing two distinguishing feature tiles for a first image.
Figure 5B:
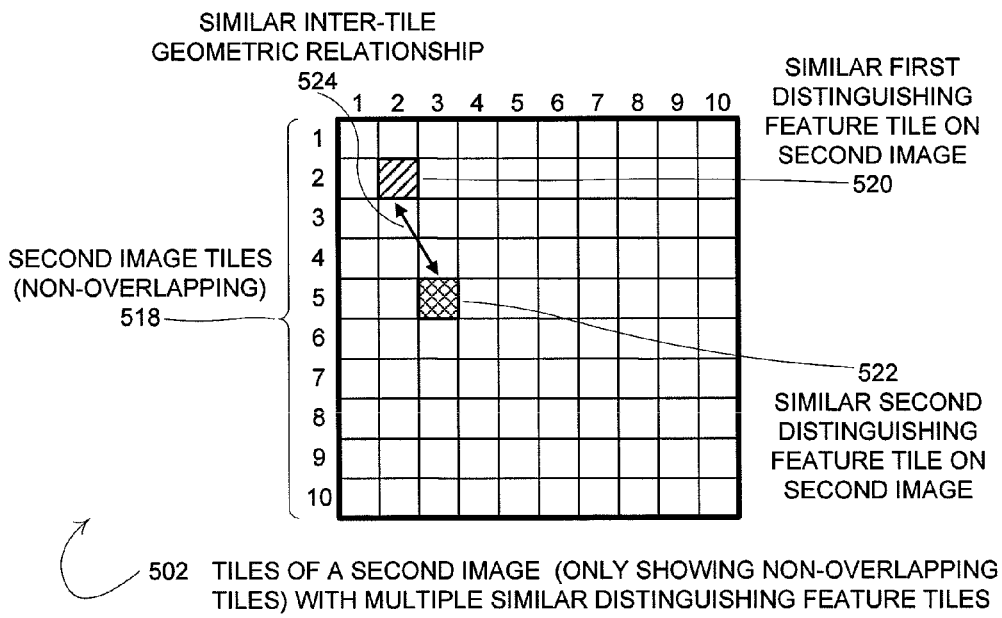
FIG. 5B is schematic representation of one layer of 10×10 tiles showing two similar distinguishing feature tiles for a second image.
Figure 5C:
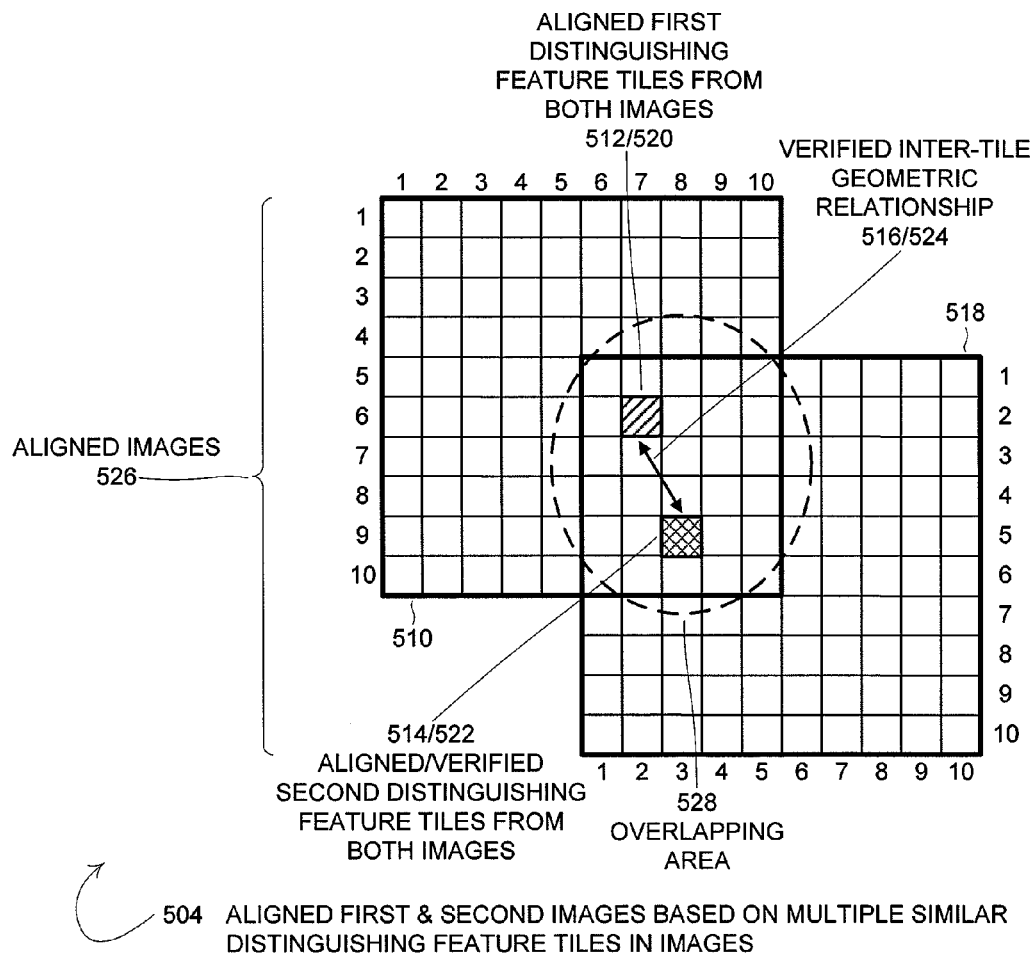
FIG. 5C is schematic representation of the first and second images of FIGS. 5A & B aligned via one of the common/similar distinguishing feature tiles and verified with the other distinguishing feature tile.

FIG. 5A is a schematic representation of one layer of 10×10 tiles showing two distinguishing feature tiles 512, 516 for a first image 510. As for FIGS. 4A-C, in the first note 506 for FIGS. 5A-C, it is noted that only non-overlapping tiles of a single layer of tiles 510 for an image 510 are shown since it is not possible to effectively convey the many over-lapping layers of potential tiles in a single two-dimensional drawing. Accordingly, one skilled in the art will recognize that there are potentially many, many more potential tiles and that the 10×10 grid of tiles 510 is shown to give a visual understanding of the alignment of two images 510, 518 once at least one distinguishing feature tile 512 is located by an embodiment and the verification of the alignment 526 of the two images 510, 518 once at least one additional distinguishing feature tile (i.e., second tile 514 for the embodiment shown in FIG. 5A) is located by an embodiment so that a geographic relationship 516 between the identified at least one distinguishing tile 512 and the at least one additional distinguishing tile 514 may be compared between the images 510, 518 to verify/ensure that the alignment 526 of the two images 510, 518 is valid (see, for example, the disclosure with respect to FIGS. 2A-F for a more detailed description of the process for finding one or more distinguishing feature tiles for one embodiment). One skilled in the art will also recognize that the 10×10 pixel grids 510, 518 shown in FIGS. 5A-C represent 10×10 tiles of pixels and not 10×10 pixels as was the case for FIGS. 2A-F and 3A-I. Thus, assuming tiles are 8×8 pixels, the image would be made up of 80×80 pixels (6400 pixels). Further, using Eq. 3 disclosed above to calculate the number of 8×8 pixel tiles for an 80×80 pixel image results in the understanding that there are 5329 possible complete 8×8 pixel tiles for an 80×80 pixel image, of which, only 100 tiles are shown in the single 10×10 tile layer shown for FIGS. 4A-C. With the understanding that only a very small number of the potential tiles for a first image 410 are shown in FIGS. 5A-C, an embodiment may use the frequency-domain transform calculation on each tile of the first image 510 to create frequency-domain first image tile key representations for each first image tile. An embodiment may then use the information-distance calculation to calculate a difference for the first image frequency-domain tile key representation of each first image tile from each other first image frequency-domain tile key representation of each other first image tile. The embodiment may then analyze the resulting discrimination metrics of the information-distance calculations in order to locate at least one distinguishing feature tile 512 and at least one additional distinguishing feature tile 514 that have the largest discrimination metrics for the tiles on the first image 510.

FIG. 5B is schematic representation 502 of one layer of 10×10 tiles 518 showing two similar distinguishing feature tiles 520, 522 for a second image 518. A similar tile difference/distinguishing tile analysis as described for the first image 510 above may be performed on the second image 518 in order to locate distinguishing feature tiles 520, 522 on the second image 518. The distinguishing tiles 512, 514, 520, 522 of the first image 510 and the second image 518 may be compared until a first tile 520 on the second image 518 that is matching/substantially similar to one of the distinguishing feature tiles 512 on the first image 510 is found. To verify that the first matching tiles 512/520 found for both the first image 510 and the second image 518 will provide proper alignment 526 (i.e., is not a false positive), an embodiment may continue to search for at least one additional (i.e., in FIG. 5B a second) distinguishing feature tile 522 of the second image 518 that matches at least one additional distinguishing feature tile 514 of the first image 510. An inter-tile geometric relationship 516 of the identified matching distinguishing feature tiles 512, 514 of the first image may then be compared to the inter-tile geometric relationship 524 of the identified matching distinguishing feature tiles of the second image 518 to determine if the inter-tile geometric relationship 516 of the tiles 512, 514 of the first image 510 matches/is substantially similar to the inter-tile geometric relationship 524 of the tiles 520, 522 of the second image 510. If the inter-tile geometric relationships 516, 524 of the distinguishing tiles 512, 514, 520, 522 of the two images 510, 518 match/are substantially similar, then the proposed alignment 526 is verified as valid, and if the inter-tile geometric relationships 516, 524 do not match/are not substantially similar, then the proposed alignment may be considered invalid, and the alignment process may be terminated or further analysis may be performed to locate at least one other matching/substantially similar set of tiles from the images that may be verified using a similar procedure as described above for the identified distinguishing tiles 512, 514, 520, 522 of the first 510 and second images 518 shown in FIGS. 2A&B. Other embodiments may skip the analysis of tile differences for the second image 518 (i.e., the information-distance calculation and associated discrimination metric analysis for each second image tile) and simply locate a tile 520 within the second image 518 that has a matching/substantially similar frequency-space tile key representation as the identified distinguishing tile 512 of the first image 510, but, as addressed above, a false positive is more likely if the distinguishing feature analysis is not utilized to narrow the field of second image tiles available for comparison. However, verification of alignment 526 discussed above may also be performed without doing the full distinguishing tile analysis on the tiles of the second image 518 such that the chance for a false positive may be reduced by the identification for an embodiment not performing distinguishing tile analysis on the second image 518 by identifying of at least one additional distinguishing tile (the second distinguishing tiles 514 of FIG. 5A) in the first image 510, and finding a matching/substantially similar frequency-space tile key representation for an additional tile (i.e., second similar distinguishing tile 522 of FIG. 5) that verifies the alignment 526 via a comparison of the inter-tile geometric relationship 516 of the identified distinguishing feature tiles 512, 514 of the first image 510 and the inter-tile geometric relationship of the identified distinguishing feature tiles 520, 522 of the second image 518. Hence, by identifying multiple matching/substantially similar distinguishing feature tiles 512/520, 514/522 in the aligned images 510, 518, an embodiment may reduce the chance for a false positive alignment 526 without the need to perform a complete distinguishing tile analysis on the tiles of the second image 518, and may provide enhanced false positive protection by both performing the distinguishing tile analysis on the tiles of the second image 518 as well as verifying alignment 526 by comparing inter-tile geometric relationships 516/524 of the identified original 512/520 and additional 514/522 matching/substantially similar distinguishing feature tiles.

FIG. 5C is schematic representation 504 of the first 510 and second 518 images of FIGS. 5A & B aligned via one of the common/similar distinguishing feature tiles 512/520 and verified with the other distinguishing feature tile 514/522. With a distinguishing tile 512 identified in the first image 510 and a similar distinguishing tile 520 found in the second image 518, an embodiment may then align 526 the first 510 and second 518 images with each other based on the substantially similar distinguishing feature tiles 512/520 of the two images 510/518 as shown in FIG. 5C. As the second note 508 states, for illustration purposes, the alignment shown in FIG. 5C is based off of the tile location within the single layer of tiles (see the first note 506) rather than explicitly based off of the pixel location identified for each tile in the images 510, 518 as would more likely be performed by an embodiment. While it is possible to align 526 the images 510, 518 based on the location of the tiles 512/520, the location of the tiles 512, 520 (and 514, 522) is a function of the pixel location identified for each tile 512, 520 (and 514, 522) within the parent image 510, 518, so location of the tiles 512/520 is essentially the same as locating the tiles 512/520 based on the pixel location of the tile 512/520 within a parent image 510, 518. As described above, each tile of an embodiment may identify (e.g., by name, by inclusion in a tile data structure, a separate cross-reference list, or otherwise linked to the tile) the pixel location of the tile 512/520, 514/522 within the parent image 510, 518 such that the alignment 526 of the first 510 and second 518 images may be based on a combination of the images 510, 518 into a single coordinate system with the distinguishing feature tiles 512/520 aligned on a pixel-by-pixel basis so the two images 510, 518 are aligned within and at the edges of the overlapping areas 528 of the images 510, 518. As discussed in more detail above in the disclosure with respect to FIGS. 5A & B, additional matching distinguishing tiles 514/522 between the images 510, 518 and the inter-tile relationships 516/524 of the matching distinguishing tiles 512/520, 514/522 for the images 510, 518 may be utilized to verify the alignment 526 of the images 510, 518. Once aligned, the images 510, 518 may be used for a variety of purposes, including creating a larger continuous image 526 of the two individual images 510, 518, stabilizing video images based on the alignment 526 between two or more consecutive images 510, 518, etc.

Figure 6:
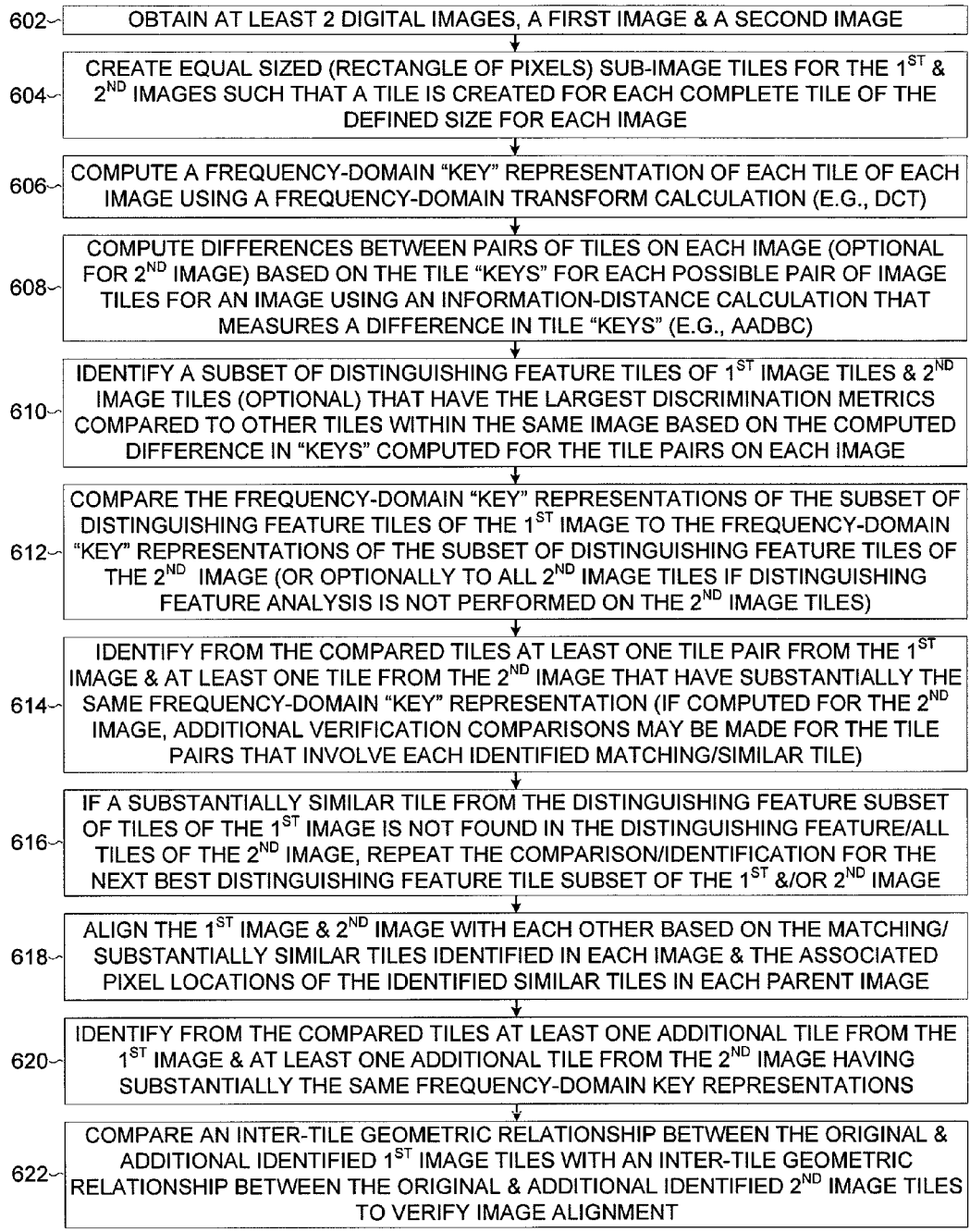
FIG. 6 is a flow chart of operation of an embodiment.

FIG. 6 is a flow chart 600 of operation of an embodiment. At step 602, at least two digital images are obtained, including a first image and a second image. As also described above, the digital images for an embodiment may be obtained from digital-camera systems, from individual frames from a sequence of frames from a digital-video system, from digital rasterization of images from analog camera systems, from digital rasterization of frames from analog video systems, and/or from rasterization of a Scalable Vector Graphic (SVG) from a digital-camera or digital-video system. While much of the disclosure herein describes operation of an embodiment for two images, more than two images may be combined using similar analysis as disclosed herein for two images. For instance, if there is overlapping area of the first image to multiple images, the same analysis performed for the first and second images may be performed for the first image and other additional images such that the first image is aligned for with a plurality of images. Further, a sequence of images may be aligned first image to second image, second image to third image, and so on if there is some consecutive overlap between the images. The plurality of aligned images may be combined to create a larger image, or the alignment between images may be used for other purposes such as stabilizing a video feed.

At step 604, an embodiment may create equal-sized sub-image tiles for the first image and for the second image. For the embodiment of FIG. 6, a sub-image tile is created for each complete tile of the defined tile size possible for each image. Other embodiments may choose to limit the number of tiles created to cover a space of each image (i.e., the expected overlapping area plus a little extra space) in order to optimize operation speed, but possibly sacrificing a more complete discrimination (i.e., more distinguished) from other tiles for possible distinguishing feature tiles. Further, the pixel location of each tile within the parent image of the tile is recorded (e.g., as part of the tile name, in a cross-reference table, etc.) for use in alignment of the images at step 618. At step 606, a frequency-domain "key" representation of each tile of each image is computed using a frequency-domain transform calculation (e.g., the DCT calculation disclosed with respect to embodiments discussed above). At step 608, a difference between pairs of tiles on each image is computed based on the tile frequency-domain key representations for each possible pair of image tiles on each image using an information-distance calculation that measures a difference in the tile frequency-domain key representations (e.g., the AADBC calculation disclosed with respect to embodiments discussed above). At step 610, an embodiment identifies a subset of distinguishing feature tiles for the first image tiles and for the second image tiles by identifying the tiles that have the largest discrimination metrics (e.g., the largest discrimination metric, the largest average metric, and/or the largest minimal metric) compared to other tiles within the same image based on the computed difference between the tile frequency-domain key representations. The subset of distinguishing feature tiles may be limited to a fixed number (e.g., K=4) of the best distinguishing feature tiles At step 612, an embodiment compares the frequency-domain key representations of the subset of distinguishing feature tiles of the first image to the frequency-domain key representations of the subset of distinguishing tiles of the second image. While it is desirable to identify the distinguishing feature tiles of the second image so that the comparison may be limited to the distinguishing feature tiles of the second image in order to eliminate false positives, it is not necessary for the operation of an embodiment. As such, the tile difference analysis (steps 608 tile difference computation and step 610 distinguishing feature tile subset identification) may be optional for some embodiments. If the distinguishing feature analysis (steps 608 and 610) has not been performed on the second image tiles, then the comparison of step 612 may be performed between the subset of distinguishing feature tiles identified for the first image and the entirety of the tiles of the second image.

At step 616, an embodiment may repeat the comparison (step 612) and identification (step 614) of distinguishing feature tiles from the first image and distinguishing feature/all tiles from the second image for the next best subset of distinguishing feature tiles of the first and/or second images. The "next best" distinguishing feature tiles may be the subset of K (e.g., 4) tiles based on the discrimination metrics used to select the original distinguishing feature tiles of the images. Step 616 may be repeated until a match/substantially similar tile is found between the first and second images or possibly until it is determined that the "next best" subset of distinguishing feature tiles does not meet a minimum threshold of distinctiveness from the other tiles of an image based on the discrimination metrics of step 610. Further, it may be desirable to first repeat steps 612 and 614 with the next best distinguishing feature tiles of the first image, then the next best distinguishing feature tiles of the second image, then back to the first image, and so on, in order to ensure that each potential distinguishing feature tile of the first image is compared to each potential distinguishing feature tile of the second image. Clearly, if the distinguishing feature analysis (steps 608 and 610) is not performed for the second image, only the next best subset of distinguishing feature tiles of the first image need to be updated. Further, the repeating process of step 616 may be optional for an embodiment such that the embodiment would simply be in error if a common distinguishing feature tile is not found on the first try of step 614. With the identification of at least one common/matching/substantially similar frequency-domain key representation for at least one tile in the first image and at least one tile in the second image from step 614, at step 618, an embodiment may align the first image and the second image with each other based on the common/matching/substantially similar tiles identified in each image in step 614 and the associated pixel locations of the identified common/matching/substantially similar tiles in each parent image.

An embodiment may optionally perform steps 620 and 622 to verify that the alignment of step 618 is valid. At step 620, an embodiment may identify from the compared tiles of step 612 at least one additional tile from the first image and at least one additional tile from the second image that have matching/substantially similar frequency-domain key representations. At step 622, an embodiment may compare the inter-tile geometric relationship between the original and additional identified first image tiles with the inter-tile geometric relationship between the original and additional identified second image tiles. If the inter-tile geometric relationship of the identified first image tiles matches/is substantially similar to the inter-tile geometric relationship of the identified second image tiles, the alignment is verified. If the inter-tile geometric relationship of the identified first image tiles does not match/is not substantially similar to the inter-tile geometric relationship of the identified second image tiles, the alignment is not verified and an embodiment may need to select different matching tiles between the images.

Various embodiments may provide the control and management functions detailed herein via an application operating on a computer system (or other electronic devices). Embodiments may be provided as a computer program product which may include a computer-readable, or machine-readable, medium having stored thereon instructions which may be used to program/operate a computer (or other electronic devices) or computer system to perform a process or processes in accordance with the present invention. The computer-readable medium may include, but is not limited to, hard disk drives, floppy diskettes, optical disks, Compact Disc Read-Only Memories (CD-ROMs), Digital Versatile Disc ROMS (DVD-ROMs), Universal Serial Bus (USB) memory sticks, magneto-optical disks, ROMs, random access memories (RAMs), Erasable Programmable ROMs (EPROMs), Electrically Erasable Programmable ROMs (EEPROMs), magnetic optical cards, flash memory, or other types of media/machine-readable medium suitable for storing electronic instructions. The computer program instructions may reside and operate on a single computer/electronic device or various portions may be spread over multiple computers/devices that comprise a computer system. Moreover, embodiments may also be downloaded as a computer program product, wherein the program may be transferred from a remote computer to a requesting computer by way of data signals embodied in a carrier wave or other propagation medium via a communication link (e.g., a modem or network connection, including both wired/cabled and wireless connections).

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for aligning a first digital image and a second digital image using an electronic computing system comprising:

creating by said electronic computing system a plurality of first image tiles for said first digital image and a plurality of second image tiles for said second digital image that are equal sized sub-images of said first digital image and of said second digital image, respectively, each tile of said plurality of first image tiles and of said plurality of second image tiles further containing location information that identifies a pixel location of each tile within said parent first digital image and said parent second digital image, respectively;

computing by said electronic computing system first image tile key representations for each first image tile of said plurality of first image tiles and second image tile key representations for each second image tile of said plurality of second image tiles using a frequency-domain transform calculation of each tile;

computing by said electronic computing system first image tile pair key differences for each possible pair of first image tiles for said plurality of first image tiles using an information-distance metric calculation;

identifying a subset of first image distinguishing feature tiles of said first image that have large discrimination metrics compared to other tiles of said first image based on said computed first image tile pair key differences;

comparing by said electronic computing system said first image tile key representations of said subset of first image distinguishing feature tiles of said first image to said second image tile key representations of said plurality of second image tiles;
identifying by said electronic computing system from said comparison of said subset of first image tiles to said plurality of second image tiles at least one first image tile key representation of said first digital image that is substantially similar to at least one second image tile key representation of said second digital image; and
aligning by said electronic computing system said first digital image with said second digital image based on said identified at least one first image tile and said at least one second image tile that have a substantially similar first image tile key representation and second image tile key representation, respectively, in accord with said pixel location of each tile within said parent first digital image and said parent second digital image, respectively.

2. The method of claim 1 further comprising:
identifying by said electronic computing system an additional subset of first image distinguishing feature tiles of said first image that have next best large discrimination metrics compared to other tiles of said first image based on said computed first image tile pair key differences and compared to said original subset of first image distinguishing feature tiles when a substantially similar tile key representation is not found for said second digital image using said original subset of first image distinguishable feature tiles; and
repeating said step of comparing said first image tile key representations of said subset of first image distinguishing feature tiles of said first image to said second image tile key representations of said plurality of second image tiles using said additional subset of first image distinguishing feature tiles as said subset of first image distinguishing feature tiles.

3. The method of claim 1 further comprising:
computing by said electronic computing system second image tile pair key differences for each possible pair of second image tiles for said plurality of second image tiles using said information-distance metric calculation;
identifying by said electronic computing system a subset of second image distinguishing feature tiles of said second image that have large discrimination metrics compared to other tiles of said second image based on said computed second image tile pair key differences; and
wherein said comparing of said first image tile key representations of said subset of first image distinguishing feature tiles of said first image to said second image tile key representations of said plurality of second image tiles limits said compared second image tile key representations to said second image tile key representations of said subset of second image distinguishing feature tiles.

4. The method of claim 3 further comprising:
identifying by said electronic computing system an additional subset of second image distinguishing feature tiles of said second image that have next best large discrimination metrics compared to other tiles of said second image based on said computed second image tile pair key differences and compared to said original subset of second image distinguishing feature tiles when a substantially similar tile key representation is not found for said second digital image using said original subset of second image distinguishable feature tiles; and
repeating said step of comparing said first image tile key representations of said subset of first image distinguishing feature tiles of said first image to said second image tile key representations of said plurality of second image tiles using said additional subset of second image distinguishing feature tiles as said subset of second image distinguishing feature tiles to limit said comparison of second image tile key representations.

5. The method of claim 3 further comprising:
comparing first image tile pair key differences to second image tile pair key differences for said at least one first image tile and said at least one second image tile identified as being substantially similar to each other to verify alignment of said first digital image and said second digital image.

6. The method of claim 1 further comprising:
identifying by said electronic computing system from said comparison of said subset of first image tiles to said plurality of second image tiles at least one additional first image tile key representation of said first digital image that is substantially similar to at least one additional second image tile key representation of said second digital image; and
comparing a first image inter-tile geometric relationship of said at least one tile and said at least one additional tile for said first digital image with a second image inter-tile geometric relationship of said at least one tile and said at least one additional tile for said second digital image such that alignment of said first digital image to said second digital image is verified if said first image inter-tile geometric relationship is substantially similar to said second image inter-tile geometric relationship.

7. The method of claim 1 wherein said frequency-domain transform calculation is one of a group consisting of: one form of non-quantized Discrete Cosine Transform (DCT) calculation, one form of quantized of DCT calculation, and a form of Fourier Transform calculation.

8. The method of claim 1 wherein said information-distance metric calculation is one of a group consisting of: Aggregate Absolute Difference by Coefficient (AADBC), variational distance, and Kullback-Leibler distance.

9. The method of claim 1 wherein said discrimination metrics are comprised of at least one of a group consisting of: largest discrimination metric, largest average metric, and largest minimal metric.

10. The method of claim 1 wherein said equal sized sub-images that make up tiles are 8×8 pixel sub-images.

11. The method of claim 1 wherein said first digital image aligned with said digital image is further aligned to at least one additional digital image.

12. The method of claim 1 wherein said first digital image aligned to said second digital image is used as a basis to perform at least one operation of a group of operations consisting of: combining at least two digital images into a larger combined single image and stabilizing consecutive images of a video stream to account for camera movement.

13. The method of claim 1 wherein said first digital image and said second digital image are obtained from at least one of a group consisting of: a digital-camera system, an individual frame from a sequence of frames from a digital-video system, from digital rasterization of an image from an analog camera system, from digital rasterization of a frame from a sequence of frames from an analog video system, from rasterization of a Scalable Vector Graphic (SVG) from a digital-camera, and from rasterization of a frame from a sequence of Scalable Vector Graphic (SVG) frames from a digital-video system.

14. An electronic computing system for aligning a first digital image and a second digital image comprising:
a tile creation subsystem that creates a plurality of first image tiles for said first digital image and a plurality of second image tiles for said second digital image that are equal sized sub-images of said first digital image and of said second digital image, respectively, each tile of said plurality of first image tiles and of said plurality of second image tiles further containing location information that identifies a pixel location of each tile within said parent first digital image and said parent second digital image, respectively;

a tile key representation calculation subsystem that computes first image tile key representations for each first image tile of said plurality of first image tiles and second image tile key representations for each second image tile of said plurality of second image tiles using a frequency-domain transform calculation of each tile;

a tile pair difference calculation subsystem that computes first image tile pair key differences for each possible pair of first image tiles for said plurality of first image tiles using an information-distance metric calculation;

a distinguishing tile identification subsystem that identifies a subset of first image distinguishing feature tiles of said first image that have large discrimination metrics compared to other tiles of said first image based on said computed first image tile pair key differences;

a matching tile subsystem that compares said first image tile key representations of said subset of first image distinguishing feature tiles of said first image to said second image tile key representations of said plurality of second image tiles and identifies from said comparison of said subset of first image tiles to said plurality of second image tiles at least one first image tile key representation of said first digital image that is substantially similar to at least one second image tile key representation of said second digital image; and an image alignment subsystem that aligns said first digital image with said second digital image based on said identified at least one first image tile and said at least one second image tile that have a substantially similar first image tile key representation and second image tile key representation, respectively, in accord with said pixel location of each tile within said parent first digital image and said parent second digital image, respectively.

15. The electronic computing system of claim 14:
wherein said distinguishing tile identification subsystem further identifies an additional subset of first image distinguishing feature tiles of said first image that have next best large discrimination metrics compared to other tiles of said first image based on said computed first image tile pair key differences and compared to said original subset of first image distinguishing feature tiles when a substantially similar tile key representation is not found for said second digital image using said original subset of first image distinguishable feature tiles by said matching tile subsystem; and
wherein said matching tile subsystem repeats operation using said additional subset of first image distinguishing feature tiles as said subset of first image distinguishing feature tiles.

16. The electronic computing system of claim 14:
wherein said a tile pair difference calculation subsystem further computes second image tile pair key differences for each possible pair of second image tiles for said plurality of second image tiles using said information-distance metric calculation;
wherein said distinguishing tile identification subsystem further identifies a subset of second image distinguishing feature tiles of said second image that have large discrimination metrics compared to other tiles of said second image based on said computed second image tile pair key differences; and
wherein said comparison within said matching tile subsystem of said first image tile key representations of said subset of first image distinguishing feature tiles of said first image to said second image tile key representations of said plurality of second image tiles limits said compared second image tile key representations to said second image tile key representations of said subset of second image distinguishing feature tiles.

17. The electronic computing system of claim 16 further comprising:
wherein said distinguishing tile identification subsystem further identifies an additional subset of second image distinguishing feature tiles of said second image that have next best large discrimination metrics compared to other tiles of said second image based on said computed second image tile pair key differences and compared to said original subset of second image distinguishing feature tiles when a substantially similar tile key representation is not found for said second digital image using said original subset of second image distinguishable feature tiles by said matching tile subsystem; and
wherein said matching tile subsystem repeats operation using said additional subset of second image distinguishing feature tiles as said subset of second image distinguishing feature tiles to limit said comparison of second image tile key representations.

18. The electronic computing system of claim 16 further comprising:
a tile pair key difference verification subsystem that compares first image tile pair key differences to second image tile pair key differences for said at least one first image tile and said at least one second image tile identified as being substantially similar to each other to verify alignment of said first digital image and said second digital image.

19. The electronic computing system of claim 14 further comprising:
An inter-tile geometric relationship verification subsystem that identifies from said comparison of said subset of first image tiles to said plurality of second image tiles at least one additional first image tile key representation of said first digital image that is substantially similar to at least one additional second image tile key representation of said second digital image, and compares a first image inter-tile geometric relationship of said at least one tile and said at least one additional tile for said first digital image with a second image inter-tile geometric relationship of said at least one tile and said at least one additional tile for said second digital image such that alignment of said first digital image to said second digital image is verified if said first image inter-tile geometric relationship is substantially similar to said second image inter-tile geometric relationship.

20. The electronic computing system of claim 14 wherein said frequency-domain transform calculation is one of a group consisting of: one form of non-quantized Discrete Cosine Transform (DCT) calculation, one form of quantized of DCT calculation, and a form of Fourier Transform calculation.

21. The electronic computing system of claim 14 wherein said information-distance metric calculation is one of a group consisting of: Aggregate Absolute Difference by Coefficient (AADBC), variational distance, and Kullback-Leibler distance.

22. The electronic computing system of claim 14 wherein said first digital image and said second digital image are obtained from at least one of a group consisting of: a digital-camera system, an individual frame from a sequence of frames from a digital-video system, from digital rasterization of an image from an analog camera system, from digital rasterization of a frame from a sequence of frames from an analog video system, from rasterization of a Scalable Vector Graphic (SVG) from a digital-camera, and from rasterization of a frame from a sequence of Scalable Vector Graphic (SVG) frames from a digital-video system.

* * * * *